Sept. 10, 1946.   L. G. DANIELS   2,407,539
VALVE SYSTEM AND CONTROL THEREFOR
Filed May 17, 1943   10 Sheets-Sheet 1

Inventor:
Lee G. Daniels
By McCanna, Wintercorn
& Morsbach
Attys.

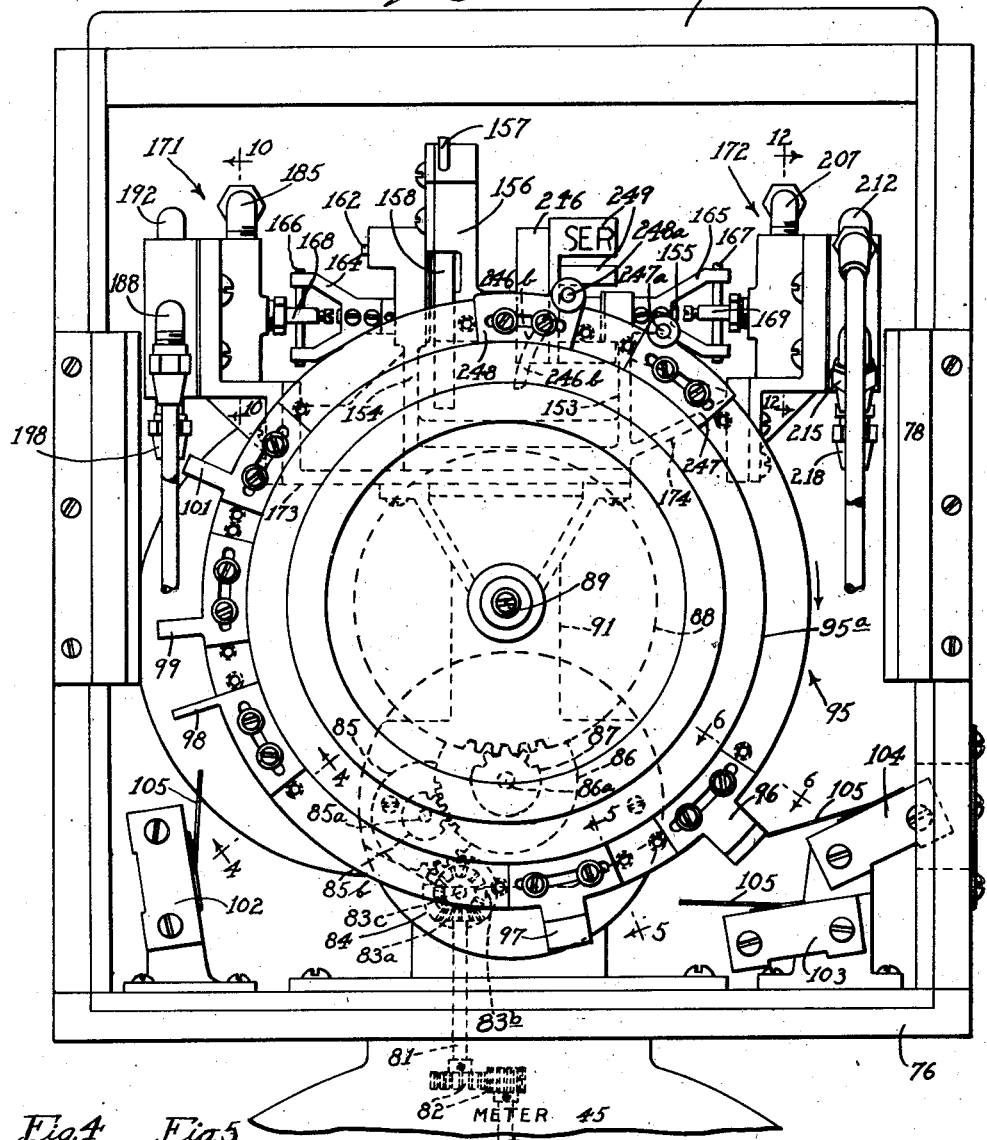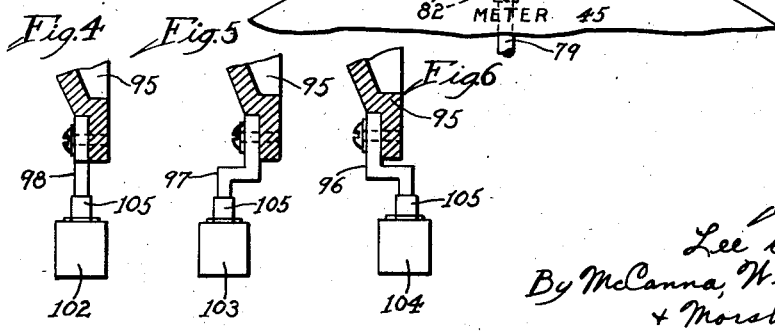

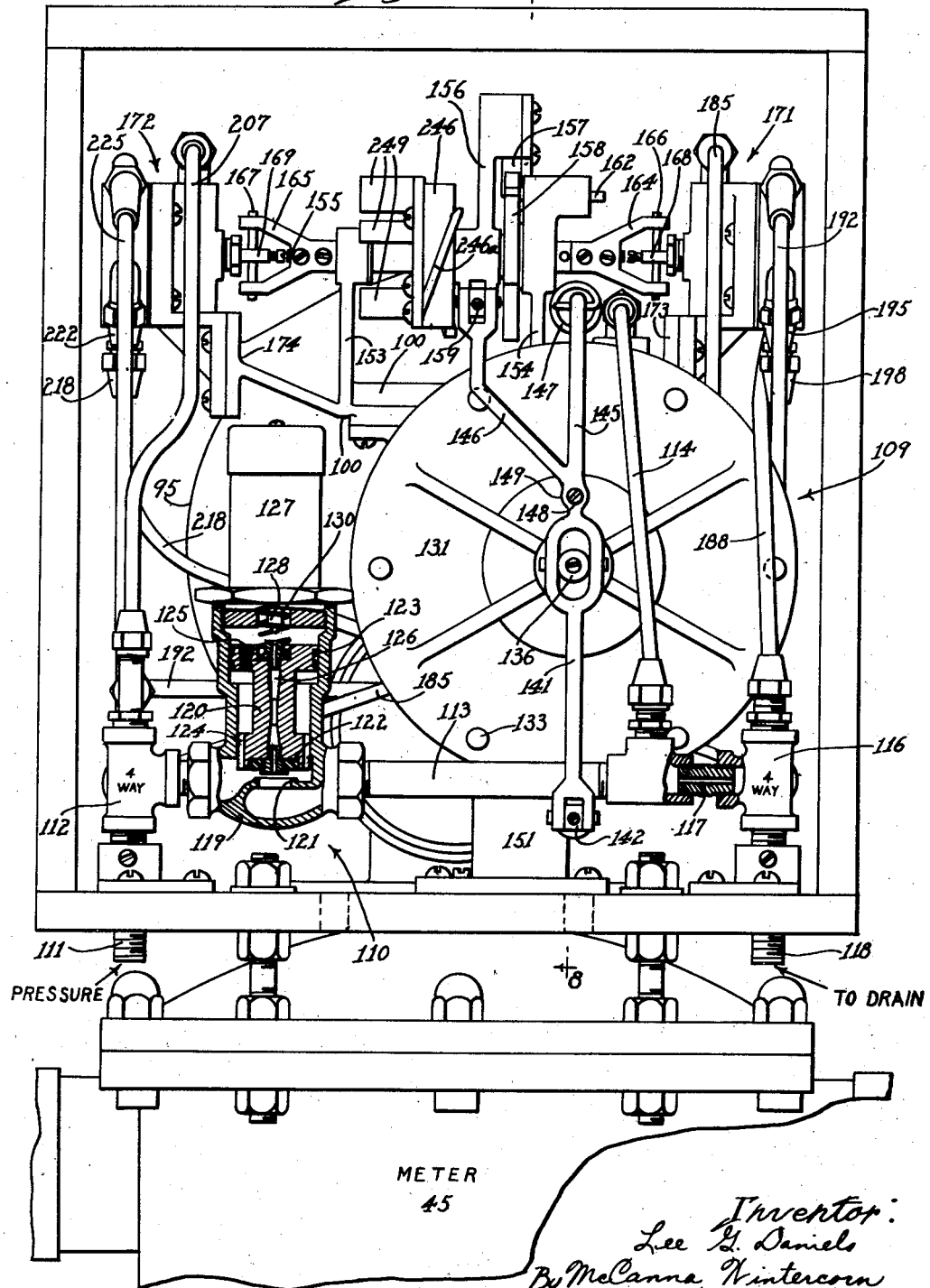

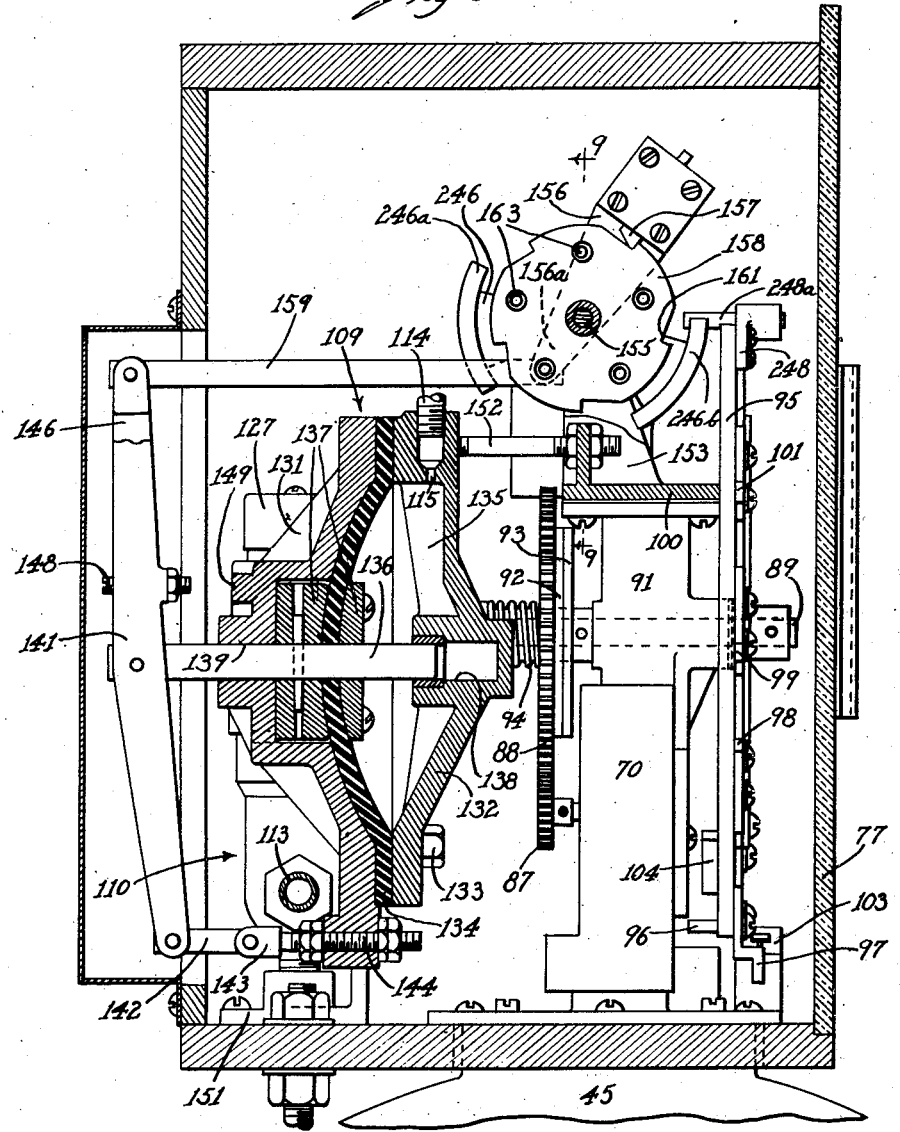

Sept. 10, 1946.  L. G. DANIELS  2,407,539
VALVE SYSTEM AND CONTROL THEREFOR
Filed May 17, 1943  10 Sheets-Sheet 5
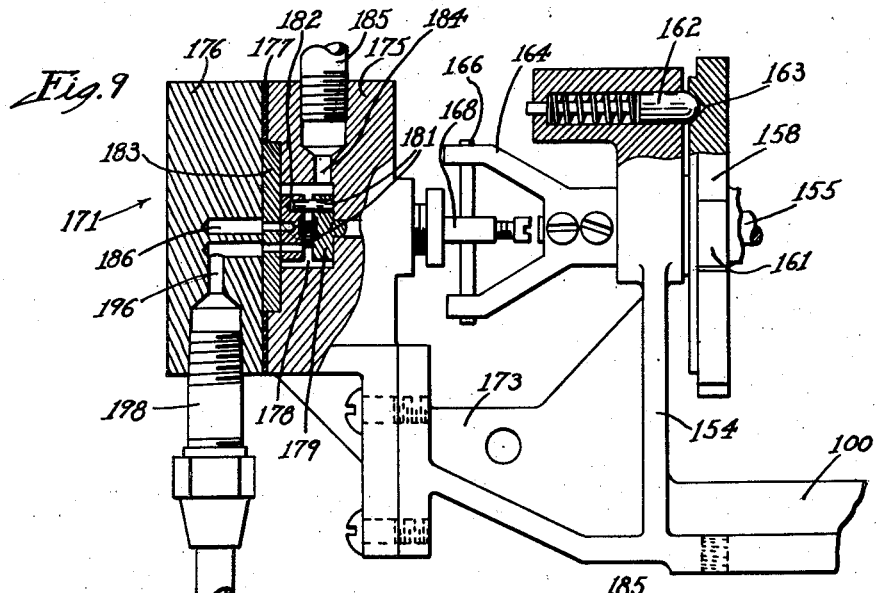
Fig. 9
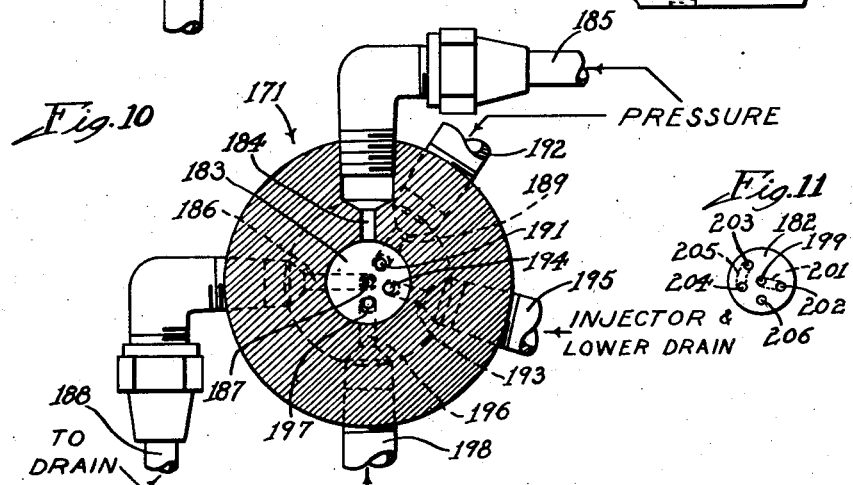
Fig. 10
Fig. 11
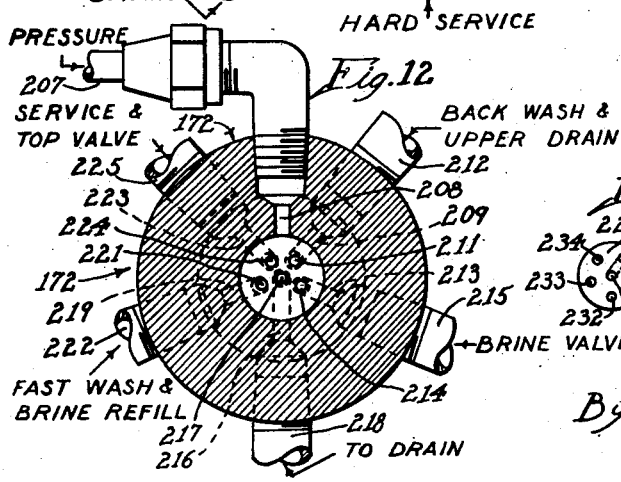
Fig. 12
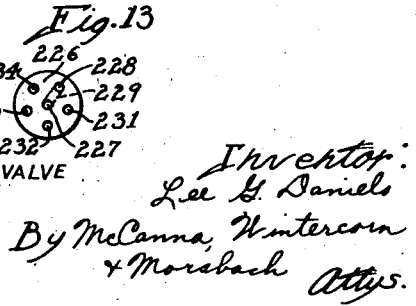
Fig. 13
Inventor:
Lee G. Daniels
By McCanna, Wintercorn
& Morsbach Attys.

Sept. 10, 1946.  L. G. DANIELS  2,407,539
VALVE SYSTEM AND CONTROL THEREFOR
Filed May 17, 1943  10 Sheets-Sheet 6
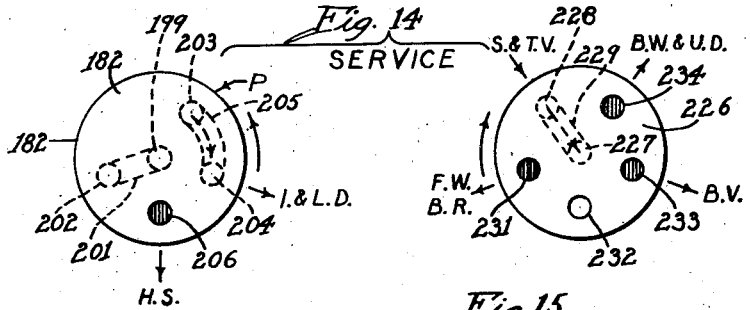
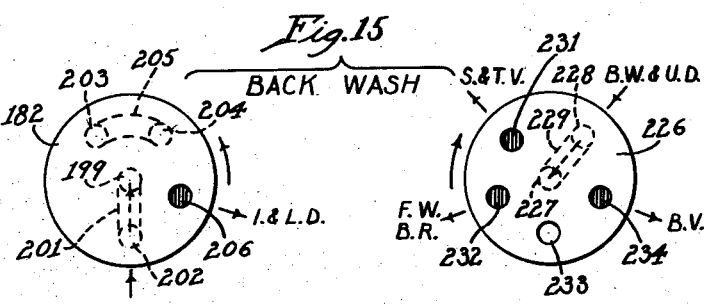
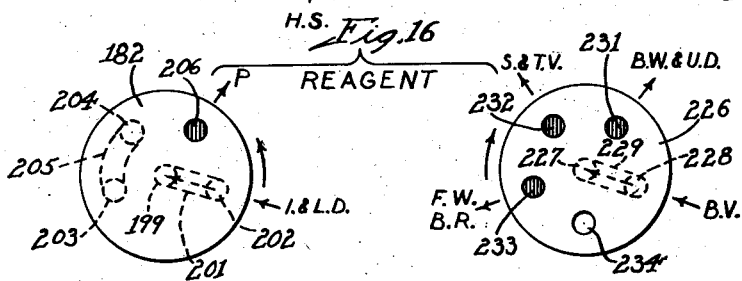
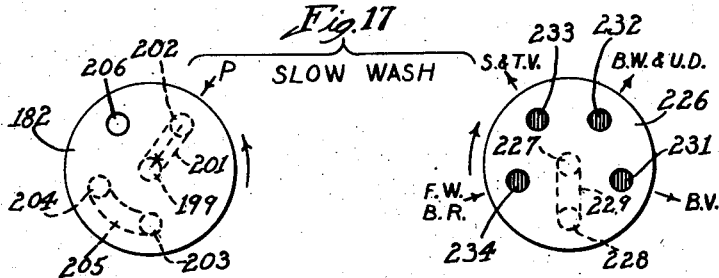
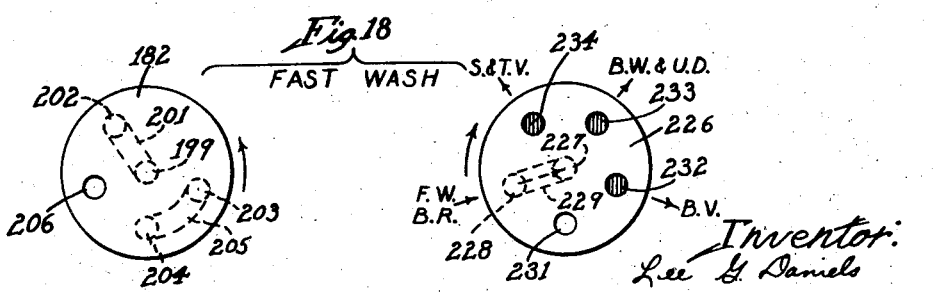
Inventor:
Lee G. Daniels
By McCanna, Wintercorn & Morsbach
Attys.

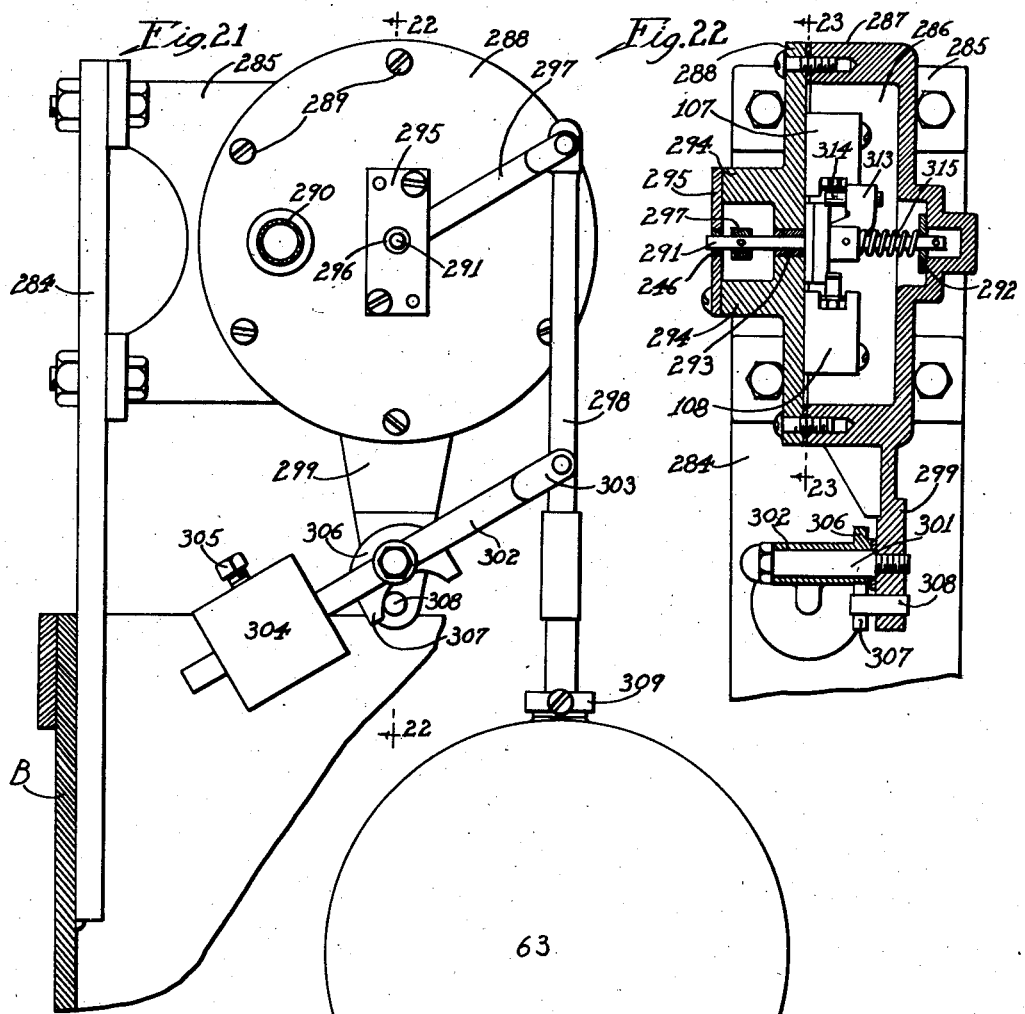

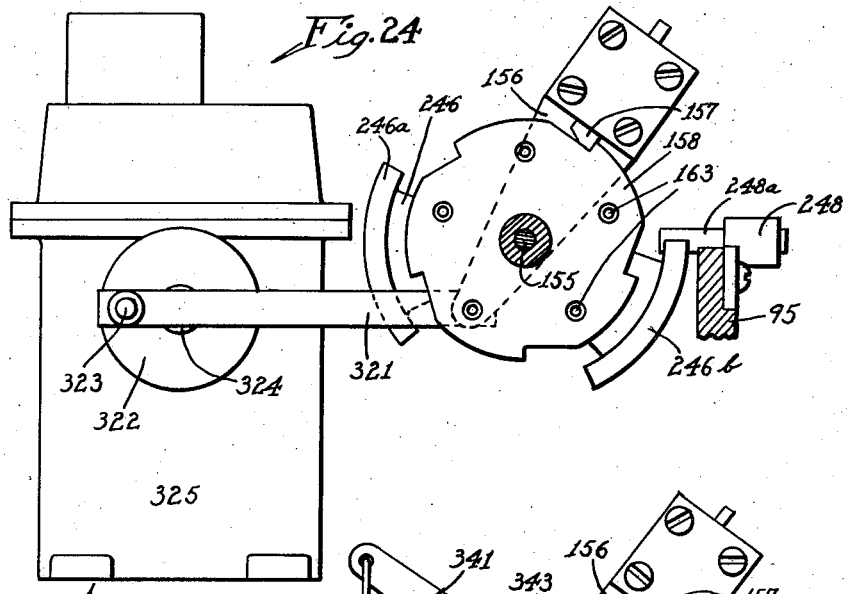
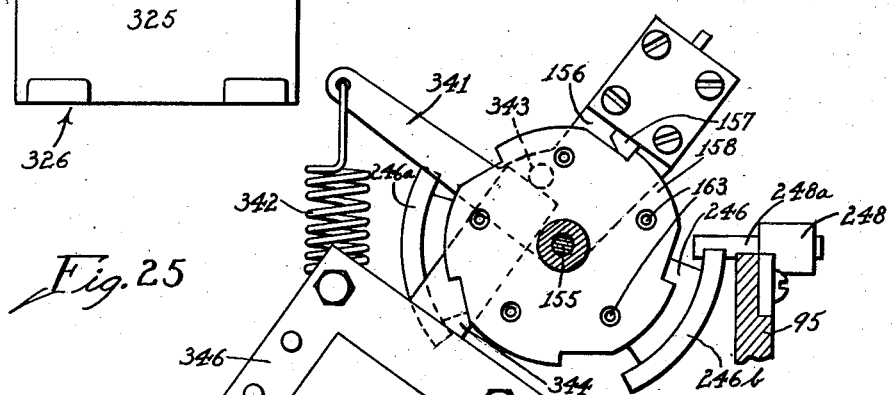
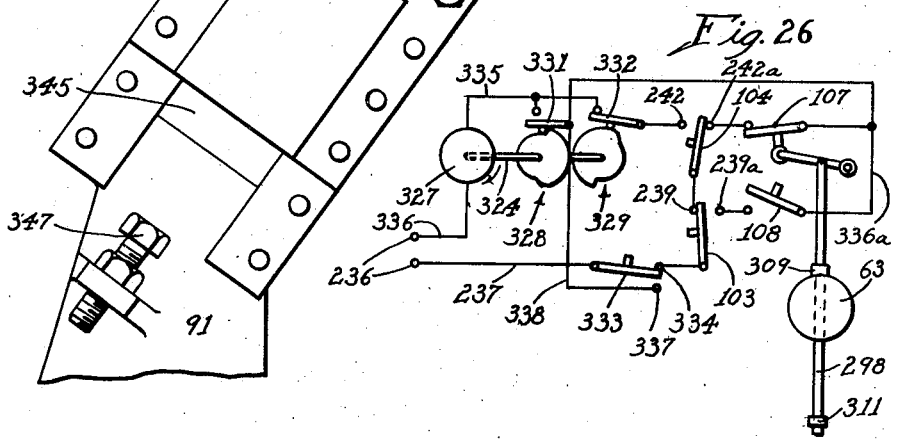

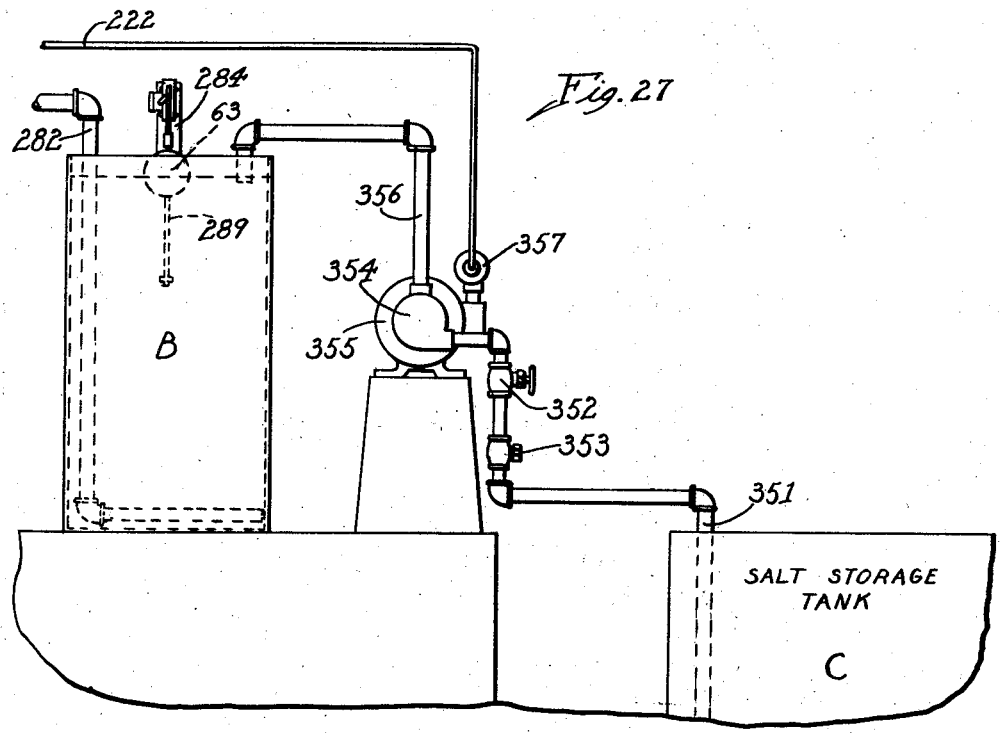
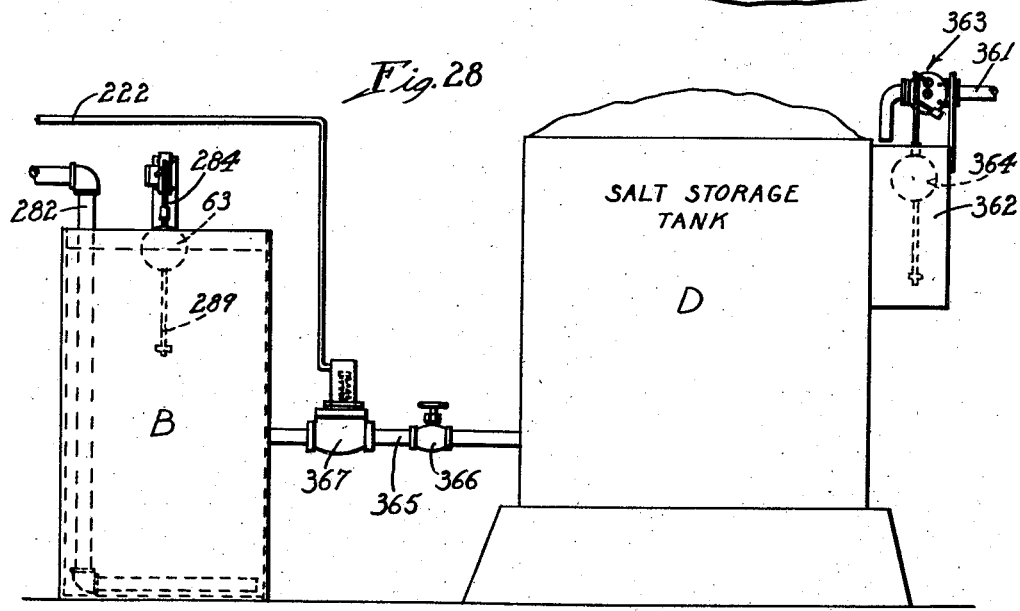

Patented Sept. 10, 1946

2,407,539

UNITED STATES PATENT OFFICE 2,407,539

VALVE SYSTEM AND CONTROL THEREFOR

Lee G. Daniels, Rockford, Ill.

Application May 17, 1943, Serial No. 487,239

24 Claims. (Cl. 210—24)

This invention relates to valve systems and automatic controls for water treatment apparatus, water softener and the like, such, for example, as that commonly used for the purpose of softening water and for other analogous purposes, and has special reference to improved apparatus for automatically controlling the operation thereof and a manual control adapted to be used in the event the electric current should go off or for other reasons when the water treating apparatus is being regenerated.

Among the objects of the invention are the provision of a valve system for water treatment apparatus having an improved system of valves for controlling the flow through the apparatus, improved means for controlling the operation of the apparatus from a water meter, and a valve structure having characteristics adapting the same for cooperation in the novel control system.

A further object of the invention is the provision of an improved control device and an improved actuator therefor.

Other objects and advantages will appear from the following description and the accompanying drawings, in which—

Fig. 3 is a front elevation of the control cabinet showing the parts in service position of the softener;

Figure 19:
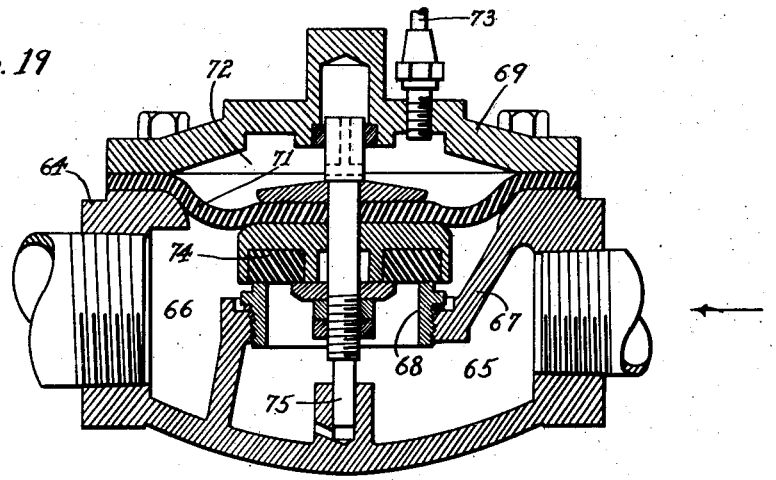
Figure 20:
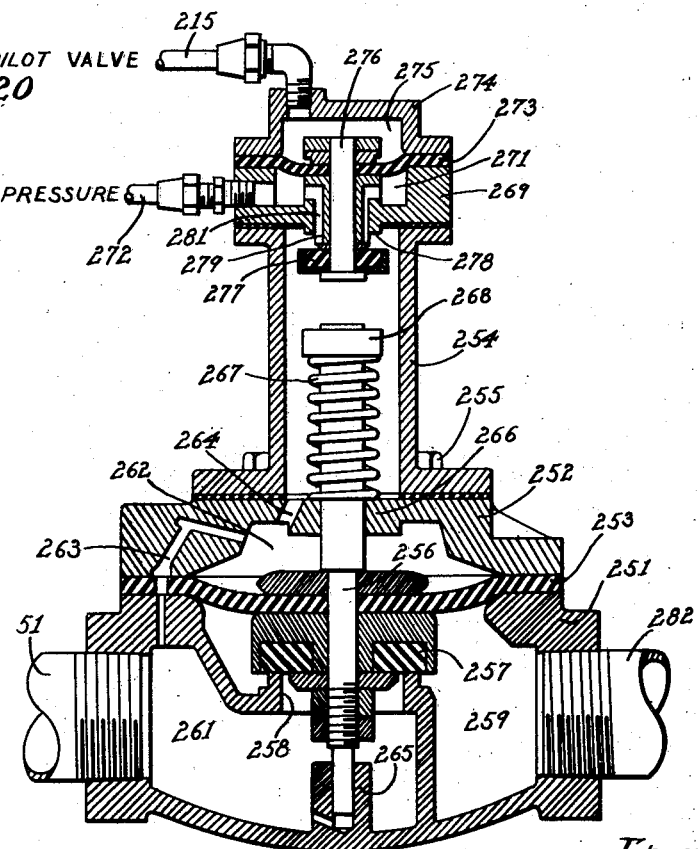

Figs. 4, 5 and 6 are fragmentary sections on the lines 4—4, 5—5, and 6—6 of Fig. 3 showing the position of the cams on the control disk;

Fig. 7 is an elevational view of the rear of the control cabinet, certain portions being in section;

Fig. 8 is a section substantially on the line 8—8 of Fig. 7;

Fig. 9 is a fragmentary section on the line 9—9 of Fig. 8, parts thereof being in elevation;

Fig. 10 is a sectional view substantially on the line 10—10 of Fig. 3;

Fig. 11 is a face elevational view of the pilot rotor shown in Fig. 10;

Fig. 12 is a sectional view substantially on the line 12—12 of Fig. 3;

Fig. 13 is a face elevational view of the rotor shown in Fig. 12;

Figs. 14 through 18, inclusive, are face views of the rotors shown in Figs. 11 and 13 arranged according to their relative positions corresponding to each valve position of the softener;

Fig. 19 is a section showing the construction of the hydraulic valves of the softener other than the brine valve;

Fig. 20 is a section showing the construction of the brine valve;

Fig. 21 is a side elevational view of the brine control mechanism;

Fig. 22 is a section on the line 22—22 of Fig. 21;

Fig. 23 is a view on the line 23—23 of Fig. 22;

Fig. 24 is an elevational view of a modified form of control actuator;

Fig. 25 is an elevational view of a still further modification of the control actuator;

Fig. 26 is a wiring diagram of a softener employing the control shown in Fig. 24, and Figs. 27 and 28 are views showing controls for alternate forms of brine systems.

The invention is herein shown as embodied in a zeolite or base-exchange water softener, but it will be understood that it is equally applicable to devices having other types of water treatment materials requiring similar or analogous regeneration treatment and which act to change properties of the liquid in addition to or instead of the hardness thereof, such for example, as the carbonaceous minerals and the like now commonly known in the art.

This is a continuation in part of my copending application Serial No. 406,188, filed August 9, 1941, entitled "Automatic water treating device."

Figure 1:
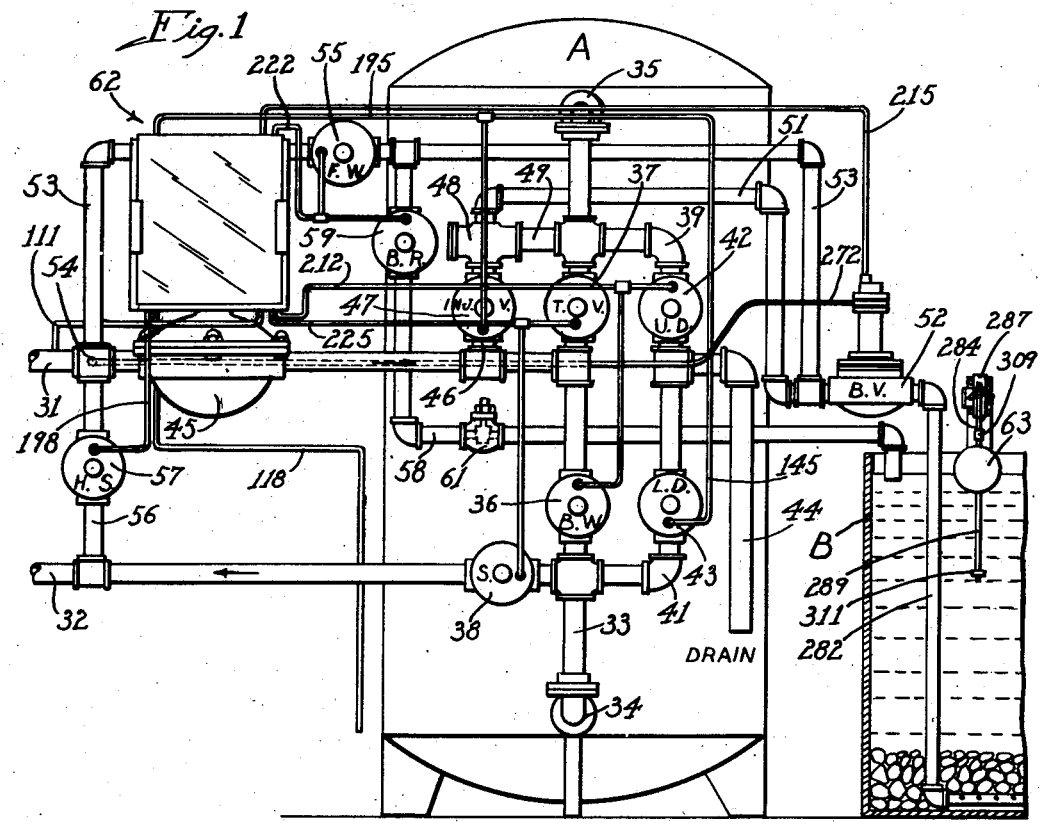
Figure 1 is a side elevational view of a water softener embodying my invention.

Referring first to Figure 1, for purposes of illustration the letter A designates a softener or a water treating tank and the letter B a brine or a reagent tank as used in the conventional type of zeolite water softener, the softener tank in conformity with the usual practice containing a bed of base-exchange material for conditioning the water passing therethrough, and the brine tank being adapted to contain brine in the usual manner, utilized for the purpose of regenerating the base-exchange material. In this instance the hard or raw water enters the system through a pipe conduit 31 and leaves the system through a service pipe conduit 32. The pipe conduit 31 is connected near the center of a vertically disposed conduit or piping 33 which enters the bottom of the softener tank as shown at 34 and the top of the softener tank as shown at 35. Interposed in the vertical conduit or piping 33 on opposite sides of the conduit 31 are hydraulic valves 36 and 37 which may have a structure such as shown in Fig. 19 and adapted to control the flow of incoming water to the top and to the bottom of the softener, the valve 36 being hereinafter referred to as the backwash valve by reason of its allowing water to enter the bottom of the softener tank for the purpose of backwashing, and the valve 37 being known as the top valve by reason of its controlling the flow of the raw water to the top of the tank. A valve 38 is disposed in the conduit 32 which braches off the vertical conduit 33 between the backwash valve and the lower end of the softener, this valve being known as the service valve because it controls the flow of water from the tank to service. Conduits 39 and 41 lead from the vertical conduit 33, the conduit 39 leading therefrom between the top valve and the upper end of the tank, and the conduit 41 leading therefrom between the backwash valve and the bottom of the tank, these conduits having valves 42 and 43, respectively, hereinafter called the upper drain valve and the lower drain valve. The conduits 39 and 41 merge into a single conduit 44 intermediate the upper and lower drain or waste valves so as to provide a single conduit to drain or waste. The raw water conduit 31 has a meter 45 disposed therein, and between the meter and the vertical conduit 33, a conduit 46 branches therefrom within which is disposed an injector valve 47. The conduit 46 terminates in a pipe fitting 48 in the form of a cross within which is disposed an injector which discharges through a conduit 49 into the vertical conduit 33 above the top valve 37. Also connected to the fitting 48 is a conduit 51 connected to the bottom of the brine tank B and within which a brine valve 52 is disposed, the brine valve 52 conveniently having the structure shown in Fig. 20. Connected into the conduit 51 is a conduit 53, the opposite end of which is, in this instance, connected into the raw water conduit 31 as indicated at 54, the conduit 53 having a valve 55 hereinafter referred to as the fast wash valve, this valve serving in the rinse step of regeneration to supply a flow of water through the conduit 51 to the fitting 48. Whereas the conduit 53 is herein shown as connected into conduit 51, it may instead be connected into conduit 33 above the valve 37 or may be connected directly into tank A above the mineral bed. In order to supply water to the service conduit 32 during the interval in which the softener is being regenerated, a conduit 56 is provided interconnecting the raw water conduit 31 and the service conduit 32 and having a hard service valve 57 for controlling the flow therethrough. A conduit 58 is connected into the conduit 53 between the valve 55 and the junction of this conduit with the conduit 51 and terminates at the top of the brine tank as shown in Figure 1, the conduit 58 having a valve 59 hereinafter referred to as the brine refill valve and serving to control the flow of water to the brine tank for the purpose of refilling the same after regeneration. The conduit 58 also has a flow regulating valve 61 adapted to be manually set to control the rate of flow through the conduit 58.

The valves 36, 37, 38, 42, 43, 47, 55, 57 and 59 are all of the general structure shown in Fig. 19, the valves being actuated by hydraulic means, the details of which will presently be described. These valves together with the brine valve 52 serve to control the flow through the softener during the service and regeneration steps. These valves are pressure operated and other mediums besides water could be used to operate them, and they could also be operated by electric or other power means with the control arranged for electrically operated valves or other types of power operated valves. Thus when the requisite amount of water has passed through the softener tank, the meter and control mechanism presently to be described functions to reposition the valves to cause backwashing of the softener. During the service operation, the top valve 37 and the service valve 38 are open and the remainder of the valves are closed and water flows from the conduit 31 through the valve 37 into the top of the tank, thence through the tank and out through the bottom connection 34, through the service valve 38 and to service through the conduit 32. When the backwash is started the service valve 38 is closed, the backwash valve 36 and the upper drain valve 42 are opened so that raw water flows from the conduit 31 through the conduit 33 and the backwash valve 36 into the bottom of the tank emerging from the tank at 35 into the conduit 33 and thence passing through the conduit 39 and the upper drain valve 42 into the drain conduit 44, the remainder of the valves being closed except the hard service valve 57 which is simultaneously opened to allow water to flow from the raw water conduit 31 into the service line 32 to provide water to the service line during the regeneration interval. At the conclusion of the backwash step of the regeneration cycle the control mechanism, indicated generally by numeral 62, operates to introduced brine into the top of the softener tank, the hard service valve 57 remaining open but the injection valve 47, the lower drain valve 43 and the brine valve 52 opening so that raw water passes from the conduit 31 through the injection valve 47 into the fitting 48 and through the injector contained therein and the conduit 49 into the upper end of conduit 33 and thence to the top of the softener tank, emerging at 34 and passing into the lower end of conduit 33 through the conduit 41 and the lower drain valve 43 into the drain line 44. During this step of the regeneration, the fast wash valve 55, the brine refill valve 59, the top valve 37, the bottom valve 36, the service valve 38 and the upper drain valve 42 are closed. This movement of the water through the injector causes brine to be drawn through the conduit 51 and the brine valve 52 into the fitting 48 from which it passes into the top of the softener admixed with the water from the conduit 46. When the level of the brine in the brine tank B drops to a predetermined level as determined by a float 63 presently to be more fully described, the control mechanism operates to reposition the valves for the rinsing out of the brine from the softener tank. In this operation all of the valves except the brine valve 52 retain their previous position, but the brine valve is closed to prevent further flow of brine from the tank to the injector in the fitting 48. Raw water thus continues to flow to drain through the path heretofore described until a sufficient amount of rinse water has passed through the softener to accomplish a major part of the rinse operation. Thereupon the control mechanism acts to open the valves 55 and 59 allowing water to flow from the raw water conduit 31 through the conduit 53 and into the conduit 51 through which it flows to the fitting 48 augmenting the supply of rinse water which is coincidentally flowing therethrough through the injector valve 47. Opening of the brine refill valve 59 allows water to flow through conduit 58 into the brine tank B to refill the same, the rate of flow being determined by the setting of the valve 61. When the brine tank has been refilled to its previous level the float 63 operates to actuate the control mechanism whereby the valves are all returned to the service position first above described to complete the regeneration cycle of the softener.

The valve shown in Fig. 19 is of a construction well known in the art, and per se forms no part of the present invention, this valve is hydraulically operated and comprises a body portion 64 having an inlet chamber 65 and an outlet chamber 66 separated by a partition 67 having a port surrounded by a seat 68. The body portion has a cap 69 and a diaphragm 71 disposed between the body and the cap, the cap being shaped to provide a chamber 72 into which hydraulic pressure may be applied through a tube or conduit 73 connecting with tubes from the pilots as will presently be described. The diaphragm 71 carries a valve disk 74 adapted to register with the seat 68, the valve disk and diaphragm having a stem 75 adapted to guide the valve disk in its opening and closing movements. It will be seen that this arrangement is such that when the hydraulic pressure is absent in the chamber 72, pressure of the fluid in the inlet chamber 65 causes the valve to open, whereas the application of pressure in the chamber 72 through the conduit 73 moves the valve disk to close the valve.

The various valves of the system are controlled from the control unit 62 shown more in detail in Figs. 3 through 13 which in this instance is mounted and carried on the meter 45. The control mechanism is in this instance housed in a cabinet indicated generally by the numeral 76 which in this instance includes a glass front panel 77 (Fig. 8) retained in position by guides 78 which permit the panel to be removed for access to the enclosed mechanism. Various phases of the operation are controlled from the meter 45 which has mounted thereon a so-called meter clock having an enclosing case 70 and reduction gearing disposed therein. The meter has the conventional driving stem 79 which drives an upstanding shaft 81 projecting into the meter clock casing (Fig. 3) through primary changeable gears 82, the stem 81 serving to drive the gearing of the meter clock. This reduction gearing will vary somewhat dependent upon the amount of gear reduction necessary for the particular installation, and in this instance comprises a bevel gear 83a fixed on the shaft 81 and a bevel gear 83b fixed on a shaft 83c. A spur gear 84 is also fixed on the shaft 83c and meshes with a gear 85 on a shaft 85a. A spur gear 85b is also fixed on the shaft 85a and is in mesh with a gear 86 on a shaft 86a. The shaft 89 is driven from the shaft 86a by a pair of secondary changeable gears 87 and 88, the gear 87 being fixed on the shaft 86a and the gear 88 being carried on the shaft 89. The shaft 89 has bearing support in a frame 91 (Fig. 8) attached to the top and the side of the meter clock case 70. The change gear 88 serves to drive the shaft 89 through a friction clutch comprising a friction disk 92 of leather or the like and a metal plate 93, the plate 93 being attached to the shaft 89 and the disk 92 being attached to the gear 88, the gear otherwise being free to turn on the shaft 89 as to provide a slip connection. The friction elements are held in frictional engagement by a spring 94 disposed on the shaft 89. Positioned on and pinned to the shaft 89 adjacent the front panel 77 is a meter disk 95, the edge of which is shown in Fig. 8 and the face in Fig. 3. Thus it will be seen that the disk is driven from the meter through the change gears 87 and 88 but is capable of movement with respect to the gear 88 by relative movement in the clutch elements 92 and 93. A plurality of switch operators or cams 96, 97, 98, 99 and 101 are disposed in spaced relation along the periphery of the disk 95, and located against the ledge 95a and the offset cams 96 and 97 being in different planes than the flat face cams 98, 99 and 101 as shown in Figs. 4, 5 and 6. Disposed adjacent the periphery of the disk and attached to the enclosure are switches 102, 103 and 104, each of these switches having enclosed operating switch mechanism enclosing a spring that is compressed to a closed position and when released is spring pressed to an open position and a leaf actuating spring such as shown at 105 adapted when depressed to close the switch, the switch being self opening upon release of the actuating spring. The switch 102 is located in a plane such that the leaf spring 105 is engaged and operated by the operators 98, 99 and 101, the switch 103 is positioned so that the spring actuator will be engaged by the operator 97 and the switch 104 is positioned so that the leaf spring thereof will be actuated by the operator 96, as will be seen from Figs. 4, 5 and 6. The switches 102, 103 and 104 are of the so-called snap-acting precision type such as those manufactured and sold by Micro Switch Corporation, Freeport, Illinois, and being characterized by being operable by very small pressure and with a small movement differential. These switches each have a spring contact arm arranged to be connected at one end to an electrical conductor, and a stationary contact arranged for a connection to the opposite conductor. The contacts are closed when the spring arm is compressed to a closed position and when released said arm is spring pressed to an open position in which the contacts are open.

Figure 2:
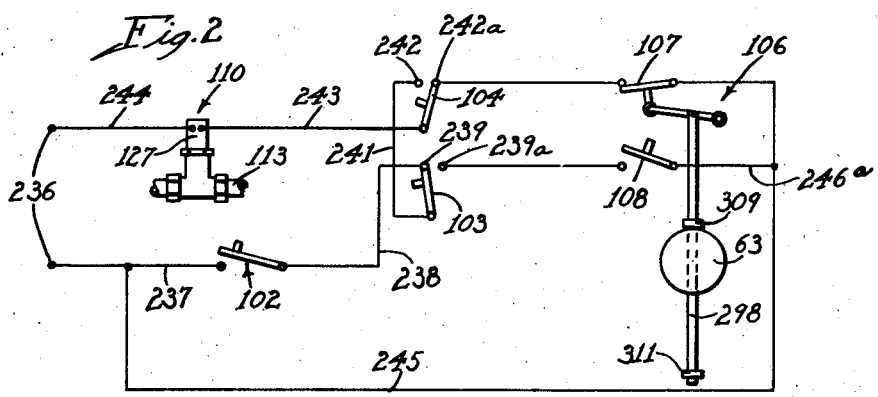
Fig. 2 is a wiring diagram thereof.

These switches are arranged in a circuit as shown in Fig. 2 in which the numeral 110 indicates a solenoid actuated valve presently to be described more in detail, and the numeral 106 indicates a brine level control such as shown more in detail in Figs. 21 through 23, the numerals 107 and 108 identifying Micro switches of the type heretofore described. Thus rotation of the disk 95 serves to close the switches 102, 103 and 104 in a preselected sequence to energize the solenoid valve 110 which in turn operates the control mechanism for the various valves.

The solenoid valve 110 is in this instance located within the control enclosure as best shown in Fig. 7 and forms one element of a control operator which also includes a hydraulic actuator 109 best shown in Fig. 8. Water under pressure for the operation of the control mechanism enters the enclosure by way of a conduit 111 and passes into a four-way fitting 112. The solenoid valve 110 is connected to the fitting and controls the flow through a pipe 113 and a conduit 114 connected to the actuator through an opening 115 (Fig. 8). The pipe 113 is also connected to a four-way fitting 116 through a bleeder orifice 117, the four-way fitting 116 being connected to a drain line 118 through which the water used in the control mechanism is drained therefrom.

The solenoid valve best shown in Fig. 7 comprises a valve body 119 having a valve seat 121 and a valve plunger 120 adapted to open and close communication through the valve seat, the valve plunger having a resilient gasket 122 adapted to engage the seat. The valve plunger is adapted for longitudinal movement in a cylinder 123 and has channels 124 and 125 for communication between the top of the piston and the inlet side of the valve body. It also has a central channel 126 for communication between the outlet side of the valve body and the top of the plunger. The outlet passage 126 is larger than the inlet passage 125. The solenoid indicated generally by the numeral 127 has an armature provided with a needle 128 adapted to seat across the upper end of the channel 126 to close communication therethrough, thus forming a needle valve. When the solenoid 127 is deenergized the armature and needle 128 move downward sealing communication through the channel 126, and simultaneously pressure water flows through the channels 124 and 125 to the upper end of the plunger and with the action of the spring 130 forces the valve to close. On the other hand, when the solenoid is energized, the needle 128 moves upwardly into the position shown in Fig. 7, reducing the pressure on top of the plunger and the pressure of the water on the inlet side of the valve forces the plunger upwardly to unseat the valve. The solenoid 127 is energized in response to operation of the switches, as will be apparent from Fig. 2, and when thus energized the parts of the valve are brought into the position shown in Fig. 7 to open the valve and permit the flow of pressure water into the pipe 113 and through the tube 114 into the actuator 109 (Fig. 8). Upon the deenergization of the circuit and of the solenoid 127, the valve 110 is caused to close and fluid is allowed to drain out of the actuator through the bleeder orifice 117 into the drain.

The actuator 109 comprises a body 131 and a cover 132 disposed thereagainst and attached thereto by screws 133, a resilient diaphragm 134 being disposed between the body and the cover and forming one wall of a chamber 135 between the body and the cover. Attached to the diaphragm 134 is a stem 136, the stem being affixed to the diaphragm through fastening blocks 137 to effect a seal therebetween, and the stem having an end disposed in a guide 138 in the cover. The stem extends through a bearing and guide 139 in the body and has a forked lever 141 pivotally attached thereto intermediate the ends of the lever. One end of the lever is pivotally attached to a link 142 which is in turn pivotally attached to a locating and adjusting screw 143 anchored on the actuator body as indicated at 144. The opposite or upper end of the lever has two arms 145 and 146, and a coiled tension spring 147 is attached at one end to the upper end of the arm 145, the opposite end of the tension spring being connected to a stationary part of the control mechanism, in this instance a bracket 100, attached to the frame 91. The spring is tensioned so that in the absence of pressure in the chamber 135 and against the diaphragm, the spring draws the upper end of the lever 141 to the right facing Fig. 8 until an adjustable stop screw 148 bears against a stop 149 on the actuator body. In this instance the actuator is secured to the housing or enclosure by a support 151 and a rod 152, the latter being secured to the bracket 100 as will be apparent from Fig. 8. Thus when the solenoid 127 is energized, pressure water flows through the pipe 113 and the tube 114 into the chamber 135 moving the diaphragm into the position shown in Fig. 8 simultaneously rotating the lever 141 to the position shown in this figure against the tension of the spring 147. A small part of this pressure water will also flow through the bleeder orifice 117, but this is insufficient to materially reduce the pressure in the system. However, when the solenoid is deenergized and the valve 110 closes, the bleeder orifice 117 permits water to flow slowly out of the chamber 135 through the tube 114 during which time the spring 147 acts to return the lever and the diaphragm to its previous position. This movement of the diaphragm and of the lever 141 serves to operate a ratchet mechanism, which in turn acts to rotate the shafts of a pair of rotary pilot valves or pilot means or control means, which in turn control the operating positions of the various valves of the softener.

Positioned on the frame bracket 100 are upwardly disposed arms 143 and 154 within which a rotary pilot shaft 155 is journaled. Rotatably positioned on the pilot shaft 155 is a ratchet means or arm 156 having a spring-pressed pawl 157 adapted to bear against the periphery of a ratchet disk or gear 158, the ratchet arm being supported on the shaft 155 and having the lower end of the arm pivotally connected to a rod 159 pivotally connecting the upper end of the arm 146 of lever 141, as will appear from Fig. 8. The ratchet disk or gear 158 has a plurality of notches as shown at 161 adapted for engagement by the pawl 157, and the disk is fixedly supported on the pilot shaft 155. It will therefore be seen that as the lever 141 moves toward the right facing Fig. 8, the ratchet lever will be rotated back in a counter-clockwise direction a sufficient distance for the pawl to engage the next notch of the ratchet disk, and when the lever moves toward the left upon the introduction of fluid into the chamber 135, the ratchet lever moves forward in a clockwise direction carrying with it the ratchet disk and the pilot shaft, thus indexing the pilot shaft through a predetermined angularity, in this instance, one-fifth of a revolution. In order to locate the pilot disk and prevent its being rotated through friction of the parts, a spring-pressed latch or locating pin 162 is positioned on the arm 154 adapted to engage in recesses 163 suitably located on the ratchet disk as best shown in Fig. 9 to locate and releasably hold the disk and the pilot shaft in the required angular positions. Attached to opposite ends of the pilot shaft 155 are yokes 164 and 165 having pins 166 and 167 passing through stems 168 and 169 of pilot valves designated generally by the numerals 171 and 172. These pilot valves are supported on arms 173 and 174 of the bracket 100 and are of the general form best shown in Fig. 9.

Pilot valves

The pilot valves are identical except for the port arrangement, the valve 171 being shown in Figs. 9, 10 and 11 and the valve 172 being shown in Figs. 12 and 13. Each of the pilots comprises two body members 175 and 176 having a gasket 177 interposed therebetween, the body members being suitably secured together as by means of screws to provide a fluid-tight seal. The body member 175 has a chamber 178 and an opening for the stem, as for example the stem 168 of Fig. 9, the stem having an enlargement as shown at 179 adapted to bear against the inner side of the chamber. This enlargement carries pins 181 engaging a ported pilot rotor 182 which seats against a stator 183 fixed against the face of the body member 176. Thus upon rotation of the stems 168 and 169 the pins 181 cause rotation of the rotors 182 to change communication with ports in the stators 183 and thus control the flow through the pilots. The port arrangement of the pilot 171 is shown in Figs. 9 through 11 in which the body member 175 has a channel 184 leading to the chamber 178 and communicating through a tube 185 to a source of pressure fluid to supply pressure fluid to the top of the pilot disk 182. The body member 176 has a channel 186 communicating with a central port 187 of the stator 183 and connected to a tube 188 leading to a drain, a channel 189 communicating with a port 191 and connected to a tube 192 leading to a source of pressure fluid, a channel 193 communicating with a port 194 in the stator and connected to a tube 195 leading to the pressure chambers of injector valve 41 and lower drain valve 43 (Figure 1) and a channel 196 communicating with a port 197 of the stator and connected to a tube 198 leading to the pressure chamber of the hard service valve 57. The pilot rotor 182 of pilot 171 is shown in Fig. 11 (which shows the contacting face of the rotor) and has a central port 199 communicating through a cross channel 201 with a port 202, the ports 199 and 202 extending only partway through the disk sufficient to intersect the cross channel 201. The disk also has radial ports 203 and 204 extending partway through the disk connected by a cross channel 205 and has a port 206 extending completely through the disk. The ports 202, 203, 204 and 206 are located on the same radius so as to register with the ports 191, 194 and 197 in the stator 183 in various positions of the pilot, as will be later described.

The port arrangement of the pilot 172 is shown in Figs. 12 and 13 and has a tube 207 connected to a source of pressure fluid which communicates with the chamber 178 of pilot 171 through a channel 208 in the body member 175 thereof. The body member 176 has a channel 209 communicating with a port 211 of the stator 183 and connected by a tube 212 to the pressure chamber of both the backwash valve 36 and the upper drain valve 42; a channel 213 communicating with a port 214 of the plate and connected by a tube 215 to the brine valve 52 presently to be more fully described; a channel 216 communicating with the central port 217 of the stator and to a drain through tube 218; a channel 219 communicating with a port 221 of the stator and connected by a tube 222 to the pressure chamber of the fast wash valve 55 and the brine refill valve 59; and a channel 223 communicating with a port 224 of the stator and connected by a tube 225 to the pressure chamber of the service valve 38 and of the top valve 37. The rotor of the pilot valve 172 shown in Fig. 13 which will hereinafter be referred to by the number 226 has a central port 227 and a radially disposed port 228 connected by a channel 229, the ports passing only partway through the disk to provide a flow from the port 228 through the channel and the port 227. The disk also has ports 231 to 234 disposed radially around the central port 227 at a uniform radius with respect thereto to establish communication with the ports 211, 214, 221 and 224 of the stator as the pilot rotor is driven, as heretofore described.

The pilot rotors 182 and 226 being driven directly from the pilot shaft 155 move together between their various positions, and these positions corresponding to the different operated positions of the main valves are diagrammatically shown in Figs. 14 through 18, in which the shaded ports represent open ports extending completely through the rotor and registering with ports in the stator of the pilots. Thus Fig. 14 shows the positions of the pilot rotors and the flow of pressure liquid therethrough in the service position of the main valves. Thus in this position of the valve the port 203 of the rotor 182 is in register with the port 191 of the stator 183 and port 204 of the rotor is in registration with port 194 so that pressure liquid flows from the pipe 192 to the pipe 195 maintaining pressure in the chamber of main valves 41 and 43 holding these valves closed. Likewise the port 206 of the disk is in registration with port 197 of the plate so that pressure fluid flows from the chamber of the pilot into the tube 198 maintaining pressure in the chamber of hard service valve 57 to maintain this valve closed. The port 202 is out of registration with any port in the stator and consequently no flow occurs to drain. On the other hand, the ports 228, 231, 233 and 234 of the rotor 226 are in registration with ports 224, 221, 214 and 211, respectively, of the stator in pilot 172 while port 232 of the rotor is out of registration with any port in the stator. This permits pressure liquid to flow to drain from the pressure chamber of the service valve 38 and the top valve 37, permitting these valves to be open, and pressure fluid flows from the chamber of the pilot through the registering ports through tube 222 to the pressure chamber of the fast wash valve 55 and the brine refill valve 59, through the tube 215 to the pressure chamber of the brine valve and through tube 212 to the pressure chamber of the backwash valve 36 and the upper drain valve 42 maintaining these valves closed. Thus in this position of the pilots all of the valves of the softener are closed except the top valve 37 and the service valve 38 so that raw water entering through the pipe 31 flows through the top valve 37 into the top of the tank A and out through the bottom of the tank A through pipe 33, service valve 38 and pipe 32 to deliver soft water to service.

*Operation*

As water flows to service the meter 45 operates to rotate the meter disk 95 in a clockwise direction facing Fig. 3, the disk being shown in this figure in the position occupied thereby directly at the start of the service run, the disk continuing to rotate until the finger 101 engages the spring leaf 105 of switch 102 to close the switch and start the regeneration cycle. The primary changeable gears and the secondary changeable gears 87 and 88 are so selected as to cause a predetermined number of gallons of water to bring about this movement of the meter disk, the number of gallons being made to correspond to the capacity of the softener or slightly under the capacity so that the disk will have completed its movement toward the switch 102 when a gallonage of water slightly less than that required to exhaust the mineral in the softener has passed therethrough. In this instance the structure is such that the gears 82, 87 and 88 may be easily changed to gears of a different ratio to adapt the control mechanism to different sizes of softeners and for waters of different hardness. It will be seen from Fig. 2 that when the switch 102 is closed a circuit will be closed between the leads 236 of the power supply and the solenoid 127 by way of the switch 102, conductors 237 and 238, contact 239 of switch 103, conductor 241, contact 242 of switch 104, conductor 243 and conductor 244, it being understood that the wiring diagram of Fig. 2 shows the position of the switches immediately after the completion of the regeneration cycle, and that switch 104 is moved to close circuit to contact 242 during the initial part of the service run. Completion of the circuit to the solenoid 127 opens the valve 110 as shown in Fig. 7, moving the diaphragm of the actuator to the position shown in Fig. 3, which in turn moves the lever 141 to rotate the ratchet mechanism to the position shown in Fig. 8 and causing the shaft 155 to rotate to move the pilot rotors to the position shown in Fig. 15.

In this position of the rotor 182 the port 202 of the rotor comes into registration with the port 197 of the stator relieving pressure from the pressure chamber of the hard service valve 57 through tube 198 allowing this valve to open and by-pass hard water into the service line 32 to provide water to service during the regeneration cycle. Also port 206 of the rotor comes into registration with port 194 admitting pressure to the pressure chambers of the injector valve 47 and the lower drain valve 43 to maintain these valves closed. Likewise the pilot rotor 226 is moved to bring the port 231 into registration with the port 224 of pilot 172 to apply pressure through the tube 225 to the chambers of the service valve 38 and top valve 37 to close these valves; port 232 is brought into registration with port 221 to maintain pressure in the chambers of the fast wash valve 55 and the brine refill valve 59 to maintain these valves closed; port 234 is brought into registration with port 214 to maintain pressure in the chamber of the brine valve 52 and maintain this valve closed, and port 228 is brought into registration with port 211 to relieve pressure in the chambers of backwash valve 36 and in the chamber of upper drain valve 42 to permit these valves to open, whereupon raw water flows through the backwash valve 36 and the pipe 33 to the bottom of tank A and out of the top of the tank through the upper drain valve 42 to the drain line 44 to effectuate backwashing of the softener.

As water flows through the meter to effectuate the backwashing, the meter disk 95 continues to rotate, and as the finger 101 moves off the leaf 105 of the switch 102, this switch opens, deenergizing the solenoid 127 and permitting the valve 110 to close. Thereupon water flows out of the actuator chamber 135 and the diaphragm returns to its initial position under the action of the spring 147, the water bleeding out through the bleeder orifice 117. This repositions the ratchet arm 156 for a subsequent operation bringing the latch 157 into the next succeeding notch of the ratchet disk 158 (Fig. 8).

As water flows to the tank during the backwash step the meter disk 95 continues to turn and to close the backwash step, the cam 99 engages the lever 105 of switch 102 to operate the switch thereby again completing the circuit to the solenoid 127 opening the valve 110 and causing the actuator to rotate the pilot shaft 155 to the next succeeding position bringing the pilot rotors to the position shown in Fig. 16 in which reagent is introduced into the tank A. At or shortly after the cam 99 closes the switch 102, the cam 97 engages the switch 103 to actuate the same so as to move the contacts thereof from contact 239 to a contact 239a (see Fig. 2), the cam 97 acting to hold the switch 103 in this position until after introduction of reagent into the tank A has been completed. In this position of the pilot rotors the port 202 of rotor 182 comes into registration with port 194 of the stator of pilot 171 allowing water to flow from the pressure chamber of injector valve 47 and from the pressure chamber of lower drain valve 43, permitting these two valves to open. Simultaneously the port 206 comes into communication with port 191, but since both ports communicate with a fluid pressure supply line, no functional result follows. In this position of pilot rotor 226, port 228 is in communication with port 214 of the stator of pilot 172 relieving pressure from the pressure chamber of brine valve 52 and allowing this valve to open. Ports 231, 232 and 233 are in registration with ports 211, 224 and 221 applying pressure in the pressure chambers of backwash valve 36 and upper drain valve 42 through tube 212, to the service valve 38 and the top valve 37 through pipe 225 and to fast wash valve 55 and brine refill valve 59 through pipe 222, thus keeping these valves in the closed position. Water then flows from the supply pipe 31 through injector valve 47 and into the injector 48 and thence into the top of the tank A, causing brine or regenerating solution to be drawn from the tank B through brine valve 52 and pipe 51 into the pipe 49 and thence passed to the top of the tank A, fluid flowing out of the tank through the pipe 33, the lower drain valve 43 and the drain pipe 44.

When the level of the reagent in the tank B reaches a preselected lower point as determined by a liquid level control shown in Figs. 1, 2 and 21 through 23, and presently to be more fully described, the low level switch 108 is closed thereby completing a circuit to the solenoid 127 by way of conductors 245 and 246a, switch 108, switch contact 239a, conductor 241, switch contact 242, and conductors 243 and 244, causing operation of the valve 110 and the actuator 109 to move the pilot rotors to the next succeeding position shown in Fig. 17 and called the slow wash position.

In this position of the pilot rotor 182 the port 202 is in communication with the port 191 of the stator, but since this connects the pressure tube 192 to drain, no functional result is produced. In this position of the pilot rotor 226 the ports 231, 232, 233 and 234 register respectively with the various ports of the stator of pilot 172 to apply pressure through the tubes 215, 212, 225 and 222 to the pressure chambers of the brine valve 52, the backwash valve 36, the upper drain valve 42, the service valve 38, the top valve 37, the fast wash valve 55 and the brine refill valve 59, the injector valve 47 remaining in the open position upon rotation of the pilot rotor 182 to the position of Fig. 17. Thus the effective operation of this movement of the pilots is to close the brine valve 52.

The flow of water through the meter and through the tank A in the brining step and the flow after the brine valve is closed causes continued rotation of the meter disk 95, and when the cam 98 of the disk closes switch 102 the valve 110 is opened and the actuator 109 operates to move the pilot disks to the next position shown in Fig. 18 initiating the fast wash step of the regeneration cycle. It will be seen that prior to this point in the movement of the meter disk 95 the cam 97 will have passed off the switch 103 to shift the switch back to the position shown in Fig. 2, which may be called the normal unactuated position of the switch. This closing of the switch 102 completes the circuit to solenoid 127 through the previously described circuit. In this position of the pilot rotor 182 no new communication is established and consequently the injector valve 47, the lower drain valve 43, and the hard service valve 57 remain open. On the other hand, in this position of the pilot disk 226 the port 228 comes into registration with the port 221 of pilot 172 relieving the pressure in the pressure chamber of fast wash valve 55 and brine refill valve 59 by way of tube 222. Also the ports 232, 233 and 234 come into registration with ports 214, 211 and 224 maintaining pressure through tubes 215, 212 and 225 in the pressure chambers of brine valve 52, backwash valve 36, upper drain valve 42, service valve 38 and top valve 37 so that raw water flows through the injector valve 47 and injector 48 to the top of the softener and raw water also flows through the fast wash valve 55, pipe 53, pipe 51 and the injector tube of injector 48 to the top of the softener, giving an accelerated volume of rinse water to the top of the softener, water flowing out of the bottom through the pipe 33, the lower drain valve 43 and the drain pipe 44. Simultaneously water flows from the pipe 53 through the brine refill valve 59 and pipe 58 to the brine tank causing the level of the liquid in the brine tank to rise. During this flow of water the meter continues to rotate the meter disk 95 bringing the cam 96 into engagement with the switch 104, causing this switch to move from the normal unactuated position engaging contact 242 (Fig. 2) into engagement with a contact 242*a*.

When the level in the brine tank has reached a predetermined upper point the liquid level control mechanism functions to operate high level switch 107 to close the circuit to solenoid 127 by way of conductor 245, switch 107, contact 242*a* of switch 104 and conductors 243 and 244 to open the valve 110 and supply pressure water to the actuator which functions to index the pilot shaft 155 and the pilot rotors back to the service position shown in Fig. 14, thereby completing the regeneration cycle of the softener. The cam 96 and the leaf spring of switch 104 are so set that the rotation of the disk 95 caused by the flow of water through the operating valves while the valves are moving to the new positions is sufficient to cause the finger to release the switch. Although offset cams 97 and 99 are arranged to close switches 103 and 104, respectively, before the low and high level switches 108 and 107 are closed, cams 97 and 96 can be arranged so that the low and high level switches 108 and 107 will be closed before the cams close switches 103 and 104.

Means are provided for operating the pilots manually when desired, such as might be required in the case of a power failure or the like, which means also serves to reposition the disk 95 after the introduction of brine and at the end of the fast wash before starting of the service step. This includes a cam member 246 fixed on the shaft 155 having peripherally arranged cam faces 246*a* and 246*b* (Figs. 3, 7 and 8). Positioned on the periphery of the disk 95 are adjustable holders 247 and 248 having pins 247*a* and 248*a* disposed in the path of the cam faces 246*a* and 246*b*. The cam faces and the pins are so positioned that as the shaft 155 rotates to change the pilots to terminate the flow of brine to the softener tank, the cam face 246*a* engages the pin 247*a* to move the disk forward to a definite position, and when the shaft 155 rotates to change the pilots to the service position the cam face 246*b* engages pin 248*a* to move the disk forward to a preselected starting position for the service run. This readjustment of the disk 95 serves to correct for inequalities in the amount of water passing through the meter during regeneration cycles of brining and fast wash, such as result, for example, from differences in pressure in the water mains or differences in the rate of flow of brine which might result from variations in the density of the salt bed in the brine tank.

In order to permit of manual operation of the pilots, a plurality of finger tabs 249 are provided on the cam member 246 equal in number to the positions of the pilots, each bearing letters or symbols as shown in Fig. 3 to identify the positions occupied by the pilots. These tabs are employed as indexing devices for manually rotating the shaft through the ratchet mechanism and for indicating to the operator the position of the valve mechanism during regeneration.

Attention is now directed to the structure of the brine valve 52 which is shown in detail in Fig. 20. This valve has a body portion 251 similar to the valve of Fig. 19, a cap 252 disposed thereon with a diaphragm 253 interposed therebetween. A casing 254 is positioned above and against the cap 252, the housing cap and body being secured together by cap screws 255 or the like. The valve has a stem 256 secured to the diaphragm 253 and carrying a valve disk 257 adapted to cooperate with the valve seat 258 to control communication between an inlet chamber 259 and an outlet chamber 261. The cap 252 has a chamber 262 and a channel 263 connects the chamber 262 with the outlet side of the valve. A second channel 264 connects the chamber with the interior of the casing 254. The body 251 has a guide 265 for the stem and the stem is also guided in a portion 266 of the cap. A compression spring 267 is disposed on the stem within the casing 254 and acts between the guide 266 and a shoulder 268 adjacent the upper end of the stem, the spring normally urging the stem to the open position of the valve. Disposed against the upper end of the casing 254 is a secondary valve body 269 having a chamber 271 connected to a source of fluid pressure by a tube 272. Disposed across the upper end of the secondary valve body 269 is a secondary diaphragm 273 and a cap 274 having a chamber 275 into which the tube 215 heretofore described communicates. The secondary diaphragm 273 carries a stem 276 which in turn carries a valve disk 277 positioned to seat against a valve seat 278 on the secondary valve body, the stem having a guide 279 passing through an opening in the secondary valve body and providing channels 281 which permit communication between the chamber 271 and the interior of the casing 254.

The tube 215 is connected to the port 214 of pilot 172 as shown in Fig. 12 and the chamber 275 constitutes the pressure control of the valve. The tube 272 is connected directly to the back side of fitting 54 (Fig. 1) so as to cause constant supply of the fluid to the chamber 271 and the tube 272 and channels 281 are of such size as to provide a substantially greater flow of fluid into the chamber 262 than can pass therethrough through the channel 263. It will thus be seen that when the pilot 172 is set to supply pressure fluid to the chamber 275 the parts occupy the position shown in Fig. 20 and the member of the valve is unseated, under which circumstances pressure fluid is supplied to the interior of the casing 254 and to the chamber 262 to exert pressure on the diaphragm 253 and keep the valve member 257 seated. However, when the pilot shifts so as to bring the tube 215 in communication with drain, the pressure in the chamber 275 drops off and the pressure of the fluid in chamber 271 moves the secondary diaphragm 273 and the valve member 277 upward into contact with the seat 278 to close communication between the chamber 271 and the interior of the casing 254. This position of the pilot occurs during the interval in which water flows through injector valve 47, consequently producing a reduced pressure in the brine pipe 51 and consequently in the chamber 261. This causes flow of pressure fluid from the chamber 262 through channel 263, and when this pressure is reduced to a preselected point the diaphragm 253 moves upward under the action of the spring 267 carrying the valve member 257 and opening communication between the valve chambers 259 and 261, whereby brine is drawn through the valve from the down pipe 282 in the brine tank into the pipe 51. When the pilot moves to a position to reestablish pressure in the chamber 275, the secondary valve member 277 again moves away from its seat and pressure from the pipe 272 is communicated to the chamber 262 at a more rapid rate than the water can flow through the channel 263, thereby building up sufficient pressure to actuate the diaphragm 253 and close off communication between the chambers 259 and 261.

The brine level control mechanism is shown in detail in Figs. 21 through 23, and this comprises an upstanding arm 284 having a bracket 285 disposed thereon and overhanging the liquid in the tank. The bracket has a chamber 286 formed by cylindrical walls 287 on the bracket, the chamber being covered by a closure plate 288 secured in place as by screws 289 and having a conduit connection 290 for attachment of conduit to carry the necessary wiring. Extending transversely of the chamber 286 is a shaft 291 journaled in the plate in a bearing 293. The outer surface of the plate has upstanding shoulders 294 bridged by a plate 295 which also carries a bearing 296 for support of the shaft 291. The shaft has pinned thereto in the space between the shoulders 294 a lever 297 having a forked end for the pivotal reception of a depending rod 298, the rod being of such length as to depend well into the liquid in the tank. The bracket 285 has a depending ear 299 upon which a bearing pin 301 is positioned and upon which a lever 302 is journaled intermediate its ends. One end of the lever has a fork 303 pivoted to the rod 298 and the opposite end of the lever is arranged for longitudinal adjustment of a weight 304 having a set screw 305 adapted to locate the weight on the lever so as to counterbalance the weight of the rod 298 and associated mechanism. Also attached to the lever is a yoke 306 having ears 307 adapted to contact a pin 308 to act as a stop in determining the limit of rotation of the lever 302. The rod 298 has spaced collars 309 and 311 and carries the float 63 disposed between these collars, the float comprising a ball having a tubular bearing 312 disposed therethrough for the reception of the rod 298 so that the ball will float up and down on the rod 298 between the limits set by the collars 309 and 311. Thus as the level of the liquid in the tank B falls, the float 63 will drop with respect to the rod 298 until it strikes against collar 311 and with continued lowering of the level the float and the rod will be carried down to actuate the switch mechanism. Likewise when the level of liquid in the tank rises, the float will move up on the rod 298 until it engages the collar 309, and thereafter the float will move the rod 298 upwardly to actuate the switch mechanism in the opposite direction. As shown in Fig. 23 the switches 107 and 108 are positioned on the inner face of the plate 288 in opposed relationship and the shaft 291 carries an arm 313 having a pin 314 therein. Upon longitudinal movement of the rod 298 it will be seen that the shaft 291 is rotated so that as the rod 298 moves upwardly as heretofore described, the pin 314 is brought into contact with the leaf of switch 107 causing the closing of this switch as shown in Fig. 2. On the other hand, when the rod 298 is moved downwardly by action of the float, the pin 314 is brought out of contact with the leaf of switch 107 permitting this switch to open and ultimately into contact with the leaf of switch 108, causing this switch to be closed. In order to avoid excessive freedom of movement a compression spring 315 is provided between a washer 292 on the shaft 291 and the lever 313 to provide a drag on the rotation of the shaft 291. The weight 304 can be adjusted to counterbalance the rod 298 so as to give a greater sensitivity than would otherwise be possible.

In Fig. 24 I have shown a modified form of actuating mechanism for causing the operation of the ratchet mechanism. In this embodiment the lower end of the ratchet arm 156 is pivotally connected to a lever 321 which is in turn pivotally connected to a disk 322 by a crank pin 323 eccentric on the disk, the disk and lever forming a crank such that when the disk is rotated through 360° the ratchet arm 156 is carried through a complete reciprocation. The disk 322 is carried on a shaft 324 projecting from the housing 325 of a program switch motor mechanism 326 such as that manufactured by the Barber-Colman Company of Rockford, Illinois.

The program switch is placed in the circuit of the control mechanism in the manner shown in Fig. 26 wherein the numeral 327 designates the motor of the program switch, the switch having switch operating cams 328 and 329 disposed on the shaft 324 or its equivalent, the surfaces of the cams being so arranged that one of the switches 331 and 332 is made before the other opens. In this instance a double throw switch 333 is substituted for the single throw switch 102 of Figs. 2 and 3. As shown in Fig. 26, the parts are shown in the position occupied thereby when the disk 95 of Fig. 3 is in the position shown in this figure and just prior to release of the switch 104. When the cam 96 releases the switch 104, the switch moves into contact with contact 242 completing a circuit to the motor 327 through conductor 237, switch 333 and contact 334 thereof, switch 103 and contact 239 thereof, switch 104 and contact 242 thereof, switch 332 and a conductor 335 to the motor, thence through conductor 336 to the power supply. The motor 327 will operate until the switch 332 is opened by action of the cam 329. Just prior to opening of the switch 332, the switch 331 will close by operation of cam 328 but since the circuit in which this switch is disposed is open, the motor will stop when the cams have been turned 180° completing the regeneration cycle of the softener. When the meter disk 95 has moved, during service operation of the softener, a sufficient distance to bring the finger 101 into contact with the switch 333, the regeneration cycle will be started, the switch 333 being moved to close circuit between conductor 237 and contact 337 of switch 333, current flowing through conductor 338 to switch 331 which is now closed, thence through conductor 335 to motor 327 and by way of conductor 336 to the source of power. Thereupon the motor will rotate shaft 324 through 180° or until switch 331 is opened by action of cam 328. This operation also serves to close switch 332 and to index the pilots to the backwash position. While water flows through the softener during the backwash step of the regeneration cycle, the meter disk 95 continues to rotate and when the cam 101 releases the switch 333, this switch returns to the position shown in Fig. 26 thereupon energizing the motor 327 by way of circuit through conductor 237, switch 333 and contact 334, switch 103 and contact 239, switch 104 and contact 242, switch 332, conductor 335 and conductor 336, whereupon the motor operates to drive the shaft 324 through 180° and move the ratchet from the position shown in Fig. 24 to a position to engage the next succeeding notch in the ratchet disk 158, which operation serves to open switch 332 and close switch 331. When sufficient water has flowed through the meter to accomplish the backwash operation as determined by setting of the cam 99 this cam operates to actuate the switch 333 again completing circuit to the motor 327 by way of conductor 237, switch 333 and contact 337, conductor 338, switch 331 and conductors 335 and 336 causing the motor to drive the shaft 324 through 180° and move the ratchet to the position shown in Fig. 24, again opening the switch 331 and closing the switch 332. This moves the pilots to start the brine injection step and as water flows through the meter to the softener, the meter disk 95 is turned until the cam 99 releases switch 333, whereupon the ratchet is repositioned by a further energization of the motor 327 through circuit comprising conductor 237, switch 333 and contact 334, switch 103 and contact 239, switch 104 and contact 242, switch 332 and conductors 335 and 336, this operation opening switch 332 and closing switch 331. Continued rotation of the meter disk 95 during the brine injection step brings the cam 97 into engagement with switch 103, moving this switch to establish circuit through contact 239a, and when sufficient reagent is withdrawn from the brine tank as indicated by the liquid level control, the switch 103 is closed, reenergizing the motor 327 by way of conductor 237, switch 333 and contact 334, switch 103 and contact 239a, switch 108, conductor 336a, switch 331 and conductors 335 and 336, the motor turning through 180° to bring the ratchet to the position of Fig. 24, open the switch 331 and close the switch 332. This operation also moves the pilots to re-arrange the valves to terminate the flow of reagent and water continues to flow to the softener rotating the meter disk 95. When the cam 97 releases the switch 103, the motor is again energized to rotate the shaft 324 and reposition the ratchet, this energization occurring through a circuit including conductor 237, switch 333 and contact 334, switch 103 and contact 239, switch 104 and contact 242, switch 332 and conductors 335 and 336, this operation also again opening switch 332 and closing switch 331. Water continues to flow through the softener during the rinse step, rotating the meter disk 95, and when the cam 98 acts on the switch 333 to close circuit to contact 337, the motor 327 is again energized to index the pilots to reset the valves to the fast rinse position, the motor being energized through conductor 237, switch 333 and contact 337, conductor 338, switch 331, and conductors 335 and 336. This brings the ratchet to the position shown in Fig. 24 and the switches 332 and 331 to the position shown in Fig. 26. As the meter disk 95 continues to rotate, the cam 98 releases switch 333 causing the motor 327 to operate and the ratchet to be repositioned, the motor being energized through conductor 237, switch 333 and contact 334, switch 103 and contact 239, switch 104 and contact 242, switch 332 and conductors 335 and 336, thus repositioning the ratchet. As the meter disk 95 rotates in response to flow of water during the fast rinse step, the cam 96 engages the switch 104 bringing the same into contact with contact 242a. The circuit is, however, open at switch 107 so that the motor is not again energized until the reagent tank is refilled as indicated by the liquid level control which thereupon functions to close the switch 107. Closing of this switch reenergizes the motor 327 by way of conductor 237, switch 333 and contact 334, switch 103 and contact 239, switch 104 and contact 242a, switch 107, conductor 236a, switch 331 and conductors 335 and 336, the motor driving the shaft 324 to bring the ratchet into the position of Fig. 24, the switches 332 and 331 into the position of Fig. 26, and to bring the pilots to a position to reenergize the valves and shift the same to the service combination. As previously pointed out, the flow of water through the meter during the start of the service run causes rotation of the disk 95, and when the cam 96 releases switch 104, the ratchet and the cams 328 and 329 are repositioned. It will be seen that this arrangement may be substituted for the actuator 109 and the solenoid valve 110 to drive the ratchet mechanism through its cycle, the motor 327 being substituted for the solenoid 127 in the circuit of Fig. 2.

A still further modified form of the actuating mechanism is shown in Fig. 25 in which the ratchet lever 156 has a laterally disposed arm 341, a spring 342 having one end attached to the free end of the arm 341 and the other connected to the frame structure 91 so as to normally urge the ratchet arm 156 in a counterclockwise direction. Disposed on and projecting from the side of the ratchet arm 156 is a pin 343 adapted for engagement by the end of a bar 344 attached to the armature 345 of a solenoid 346 supported on the frame structure 91. An adjustable stop screw 347 is positioned on the frame structure to limit the return movement of the solenoid armature. The solenoid 346 is adapted for substitution for the solenoid 127 in the circuit of Fig. 2 so that when the solenoid 346 is energized the armature moves upward, bringing the bar 344 into contact with the projection 343 thereby causing rotation of the ratchet arm 156 to the position shown in Fig. 25. Upon deenergization of the solenoid the armature 345 drops down against the stop 347 retracting the bar 344, and the ratchet arm 156 is returned in a counterclockwise direction by action of the spring 342.

In many large industrial water treatment installations means are provided for storing relatively large quantities of salt, the brine in the tank B being replenished after each regeneration. In order to render such installations fully automatic, it is necessary to effect control over the replenishing of the brine, and in Figs. 27 and 28 I have shown the manner in which my control mechanism may be extended to accomplish this purpose where specifically different types of brine replenishing mechanisms are employed.

In Fig. 27 I have shown a construction in which the brine is pumped from a salt storage tank into the brine tank B. In this construction the letter C indicates the salt storage tank into which a pipe or conduit 351 is disposed so that brine may be drawn from adjacent the bottom of the tank. The conduit 351 has disposed therein a flow regulating valve 352 for the purpose of restricting or regulating the rate of flow through the conduit, and likewise has a check valve 353 for preventing return flow in the conduit. The conduit 351 is connected to a pump 354 driven by an electric motor 355, the outlet of the pump having a conduit 356 disposed to discharge into the brine tank B. For the purpose of controlling the motor 355 so as to cause the pump to start and stop at the required time, a pressure switch 357, of conventional design, is employed, this pressure switch being connected to the tube 222 of pilot 172, this being the same tube which is connected to the fast wash valve 55.

It will be seen that this mechanism serves substantially the same function as the brine refill valve 59, the conduit 58 and the flow regulating valve 61, and thus where the brine tank B is to be refilled from a salt storage tank the latter elements may be replaced by the mechanism shown in Fig. 27.

In Fig. 28 I have shown a still further structure by which the brine tank may be refilled from a salt storage tank, the salt storage tank in this instance being indicated by the letter D. Water is supplied to the salt storage tank from a water supply pipe 361 which delivers into a chamber 362 disposed on the side of the salt storage tank adjacent the top thereof. The flow of water into the tank is controlled by a conventional float valve indicated by the numeral 363, the valve being open when the float 364 thereof reaches a preselected lower position and closed when the float returns to its elevated position in response to change in level of the liquid in the salt storage tank. The salt storage tank is connected to the brine tank B by means of a conduit 365 in which is positioned a flow regulating valve 366 similar in structure and function to valve 61 of Figure 1. There is also disposed in the pipe 365 a hydraulically operated valve 367 which is a valve of the type well known in the art, the valve being hydraulically closed and spring opened. The valve 367 is connected to the tube 222 leading to the pilot 172 so that the valve 367 is actuated by the hydraulic pressure therein to be opened during the interval in which the fast wash valve 55 is open, and when the fast wash valve is closed, the spring operates to close the valve 367. Thus the mechanism of Fig. 28 is substituted for the brine valve 59, the pipe 58 and the flow regulating valve 61 where it is desired to refill the brine tank B from a salt storage tank. The flow regulating valves 352 of Fig. 27 and 366 of Fig. 28 serve to adjust the rate of flow of brine to the tank B to cause the tank to reach its refilled condition when the required amount of washing has been accomplished through the fast wash valve 55. In other words, these valves permit control over the timing of the fast wash step.

I claim:

1. The combination in an automatic water treating apparatus having a water treating tank, piping connected to both ends of said treating tank, a water supply pipe, a service pipe, a waste pipe connected to said pipes and piping, a plurality of power operated valves located in said pipes and piping, of control means comprising a meter located in said water supply pipe, a disk rotated by said meter as water flows therethrough, a plurality of flat and offset cams on said disk, an electric circuit, a plurality of electrical switches arranged in said circuit and positioned to be actuated by said cams, and means for operating said valves controlled by said switches.

2. The combination in an automatic water treating apparatus having a water treating tank, piping connected to both ends of said treating tank, a water supply pipe, a service pipe, a waste pipe connected to said piping, a plurality of power operated valves located in said pipes and piping, of control means comprising a meter located in said water supply pipe, a disk rotated by said meter as water flows therethrough, a plurality of flat and offset cams disposed around the periphery of said disk, an electric circuit, a plurality of electrical switches arranged in said circuit and positioned to be actuated by said cams, means arranged for opening and closing said valves controlled by said switches, and means for individually adjusting the position of each of said cams on said disk to vary the point of actuation of said switches and the consequent operation of said valves.

3. The combination in an automatic water treating apparatus having a water treating tank, piping connected to both ends of said treating tank, a water supply pipe, a service pipe, and a waste pipe connected to said piping, a plurality of power operated valves located in said pipes and piping, control means including a fluid meter located in said water supply pipe, a meter clock driven by said meter as fluid flows therethrough through a set of primary change gears, a disk driven by said meter clock through a set of secondary change gears, a plurality of individual adjustable cams on said disk, an electric circuit, a plurality of electrical switches arranged in said circuit and positioned to be actuated by said cams, and means for operating said valves controlled by said switches.

4. The combination in an automatic water treating apparatus having a water treating tank, piping connected to both ends of said treating tank, a water supply pipe, a service pipe, and a waste pipe connected to said piping, a plurality of power operated valves located in said pipes and piping, control means including a water meter located in said water supply pipe, a disk rotated by said meter as water flows therethrough, a plurality of individual flat and offset cams on said disk, an electric circuit, a plurality of electrical switches arranged in said circuit and positioned to be actuated by said cams, one of said cams actuating one of said switches three times, other of said cams operating the other of said switches one time each, and means for operating said valves controlled by said switches.

5. The combination in an automatic water treating apparatus having a water treating tank, a water supply pipe, a service pipe, and a waste pipe connected to both ends of said treating tank, a plurality of pressure operated valves located in said pipes and piping, of control means comprising two pilot valves, said pilot valves having a water supply under pressure from said water supply pipe and a waste outlet, and having a rotatable shaft for driving the same to successive positions to control said pressure operated valves from a service position, through regeneration positions, and back to the service position, means for indexing said shaft, a water meter located in said water supply pipe, a disk carrying cams driven by said meter as water flows therethrough, an electric circuit, a plurality of electrical switches arranged in said circuit and disposed in the paths of said cams for energizing said indexing means upon the closing of said switches to index said shaft, and means for repositioning the driving means upon the release of said switches by said cams.

6. The combination in an automatic water treating apparatus having a water treating tank, piping connected to both ends of said tank, a water supply pipe, a service pipe, and a waste pipe connected to said piping, a plurality of power operated valves located in said pipes and piping, of control means comprising a meter located in said water supply pipe and arranged to operate as water flows therethrough, a housing, means for mounting the housing on top of the meter, and a control for said valves enclosed within the housing comprising a cam carrier, gearing disposed between said meter and said cam carrier including secondary changeable gears, a plurality of cams individually adjustably disposed on said carrier, an electric circuit having a source of electric current, a plurality of electric switches located in said circuit and positioned in the path of said cams for actuation thereby, and means for operating said valves controlled by said switches.

7. The combination in an automatic water treating apparatus having a water treating tank, piping connected to both ends of said tank, a water supply pipe, a service pipe, and a waste pipe connected to said piping, a plurality of power operated valves located in said pipes and piping, of control means for operating said valves comprising a meter located in said water supply pipe, a disk driven by said meter as water flows therethrough, a plurality of individually adjustable cams disposed on said disk in a plurality of planes extending transversely of the axis of rotation of the disk, an electric circuit having a source of electric current, a plurality of electrical switches arranged in said circuit, a switch disposed in each of said planes for actuation by the cam moving in said plane, and means for operating said valves controlled by said switches.

8. The combination in an electric water treating apparatus having a water treating tank, piping connected to both ends of said tank, a water supply pipe, a service pipe, and a waste pipe connected to said piping, a plurality of power operated valves located in said pipes and piping, of control means for said valves comprising a meter located in said water supply pipe, a disk cam carrier driven by said meter as water flows therethrough, individually adjustable cams attached to the periphery and located against a ledge of said carrier in a plurality of planes extending transversely of the axis of rotation of the carrier, an electric circuit having a source of electric current, a plurality of electrical switches located in said circuit, a switch disposed in each of said planes for actuation by the cam moving in said plane, each of said switches comprising a self-returning snap acting switch of small operating pressure and movement differential and a resilient actuator extending into the path of said cam, and means for operating said valves controlled by the closing and opening of said switches.

9. The combination in an automatic water treating apparatus having a water treating tank, piping connected to both ends of said tank, a water supply pipe, a service pipe, and a waste pipe connected to said piping, a plurality of power operated valves located in said pipes and piping, of means for operating said valves including pilot means, said pilot means having a rotatable shaft for rotating the same to preselected positions to control said valves from a service position, through regeneration positions, and back to the service position, means for indexing said shaft, a meter located in said water supply pipe, a cam carrier driven by said meter as water flows therethrough, a plurality of individually adjustable cams on said carrier, said cam carrier having a ledge against which said cams are located and having a flat surface at right angle relation to said ledge against which said flat surface said cams are attached, an electric circuit having a source of electric current and electrical switches located in said circuit and disposed in the path of said cams for energizing said indexing means for operation of the same to periodically index said shaft upon actuation by said cams and to reposition said indexing means upon release of said switch by said cams, each of said switches comprising a snap acting self-returning switch of small operating pressure and movement differential and a resilient actuator extending into the path of a cam.

10. The combination in an automatic water treating apparatus having a water treating tank, piping connected to both ends of said tank, a water supply pipe, a service pipe, and a waste pipe connected to said piping, a plurality of power operated valves located in said pipes and piping, of means for operating and controlling said valves including pilot means, said pilot means having a rotatable shaft for driving the same through successive angular positions to control said valves from a service position, through regeneration positions, and back to the service position, a ratchet means for indexing said shaft, means for driving said ratchet to index said shaft, a meter located in said water supply pipe, a cam carrier driven by said meter as water flows therethrough, flat and offset cams attached to a flat surface on and adjacent to the rim of said cam carrier, an electric circuit having a source of electric current, electrical switches arranged in said circuit and disposed in the paths of said cams to be actuated thereby to cause flow of said electric current for energizing said driving means upon closing of said switches to index said shaft and for repositioning said driving means upon opening of said switches.

11. The combination in an automatic water treating apparatus having a water treating tank, piping connected to both ends of said tank, a water supply pipe, a service pipe, and a waste pipe connected to said piping, a plurality of power operated valves located in said pipes and piping, of means for operating and controlling said valves comprising pilot means rotatable through successive angular positions to control said valves from a service position, through regeneration positions, and back to the service position, said pilot means having a shaft for driving the same, a ratchet means on said shaft for driving the same progressively from position to position, an actuator operable through a driving stroke for driving said ratchet in one direction, spring means for returning said actuator and said ratchet, electrically operated valve for admitting pressure liquid to said actuator to operate said actuator, a fluid meter located in said water supply pipe, a cam carrier driven by said meter in response to the flow of liquid through said meter, a plurality of individually adjustable cams on said carrier, an electric circuit having a source of electric current, a plurality of electric switches arranged in said circuit and positioned for actuation by said cams to establish circuits to said electrically operated valve for the operation thereof upon energization of said circuits.

12. An automatic water treating apparatus comprising, in combination, a water treating tank containing a bed of treating material, piping connected to both ends of said treating tank, a water supply pipe therefrom, a service pipe, and a waste pipe connected to said piping, a reagent tank, a reagent pipe therefrom connected to said treating tank, a source of fluid for said reagent tank, pressure operated valves located in said pipes and piping, rotary pilot valve means rotatable to preselected positions and arranged to operate and position said valves from a service position, through regeneration positions, including drawing reagent from said reagent tank and refilling the same, and back to service position, a shaft for rotating said pilot valve means from one position to another, and electrically operated means for operating said shaft, a water meter located in said water supply pipe, a cam carrier driven by said meter in response to the flow of water through said meter, a plurality of individual flat and offset cams on said carrier, an electric circuit having a source of electric current, a plurality of electric switches arranged in said circuit and positioned for actuation by said cams to establish circuits to said electrically operated means for operation thereof upon energization of said circuits, and a cam attached to said shaft for moving forward and repositioning said cam carrier in each revolution thereof.

13. An automatic water treating apparatus comprising, in combination, a water treating tank containing a bed of water treating material, piping connected to both ends of said water treating tank, a water supply pipe, a service pipe, and a waste pipe connected to said piping, a reagent tank having a source of fluid supply, a reagent pipe from said reagent tank having a connection to said treating tank, a plurality of power operated valves located in said pipes and piping, said valves operable through a sequence of combinations, of control means comprising operating means for said valves including a circuit having a source of electric current, a plurality of switches located in said circuit, a liquid level control in said reagent tank having an upper and a lower switch for energizing said circuit, a fluid meter located in said water supply pipe, a cam carrier driven by said meter in response to the flow of liquid therethrough, cam means on said carrier, switch means in said circuit disposed in the path of said cam means for actuation thereby to energize said circuit and operate said valves at preselected positions of said carrier, cam means on said carrier in different planes from that of the first mentioned cam means, and switch means in said circuit in the path of the second mentioned cam means for selectively connecting said upper and said lower switches of said liquid level control into said circuit at preselected different positions of said cam carrier to energize said circuit and operate said valves in response to operation of said liquid level control.

14. An automatic water treating apparatus comprising, in combination, a water treating tank, a reagent tank and reagent injection means, piping connected to both ends of said treating tank, a water supply pipe, a service pipe, and a pipe to waste connected to said piping, a source of water supply to said reagent tank and a reagent pipe from said reagent tank connected to said treating tank, a plurality of pressure operated valves located in said piping and pipes, said valves operable through a sequence of open and closed combinations, pilot valve means arranged to supply pressure to said pressure operated valves to close said valves and to relieve pressure therefrom to open them of control means comprising said pilot valve means rotatable through successive angular positions each controlling a valve combination, said pilot valve means having a shaft for indexing the same, a ratchet for indexing said shaft progressively from one position to another position in step fashion, an electric device for moving said ratchet including an electric circuit having a source of electric current, a plurality of switches located in said circuit, a liquid level control in said reagent tank having an upper and a lower switch arranged for energizing said circuit at a low level and a high level of the reagent therein to operate said valves, a water meter located in said water supply pipe, a cam carrier driven by said meter in response to the flow of liquid therethrough, cam means on said carrier, switch means in said circuit disposed in the path of said cam means for actuation thereby to energize said circuit and operate said valves at preselected positions of said carrier, cam means on said carrier in different planes from that of the first mentioned cam means, and switches in said circuit in the path of the second mentioned cam means for selectively connecting said upper and lower switches of said liquid level control into said circuit at preselected different positions of said cam carrier to energize said circuit and operate said valves in response to operation of said liquid level control.

15. An automatic water treating apparatus comprising, in combination, a water treating tank a reagent tank and reagent injection means, piping connected to both ends of said treating tank, a water supply pipe, a service pipe, and a waste pipe connected to said piping, a source of fluid supply for said reagent tank, a reagent pipe from said reagent tank having a connection to said treating tank, pressure operated valves located in said pipes and piping, rotary pilot valve means rotatable to preselected positions and arranged to control and position said valves from a service position, through regeneration positions and back to said service position, one of said valves being a reagent injector valve and another of said valves being a reagent refill valve, said pilot valve means serving in one position to open said reagent injector valve to draw reagent from said reagent tank, and said pilot valve means serving in another position to open said reagent refill valve to refill said reagent tank, said pilot valve means having a shaft carrying a ratchet gear and ratchet means thereon for rotating said pilot valve means progressively from one position to another, an electrically controlled device for moving said ratchet means and said ratchet gear forward and return to a starting position, a spring locating means for locating said ratchet gear and said pilot valve means in each position and preventing return movement thereof upon return of said ratchet means, a water meter located in said water supply pipe, a cam carrier arranged to be rotated as water flows through said meter, said cam carrier having attached thereon individually adjustable cams, said cams being spaced on said carrier in spaced relation to the flow of water through said meter, an electric circuit having a source of electric current, a plurality of electrical switchs, said switches and said eletrically controlled device arranged in said circuit, a level operated means in said reagent tank, two of said switches arranged to be actuated by said level operated means and others of said switches arranged in the paths of said cams to be actuated thereby to cause a flow of electric current to operate said electrically controlled device for moving said ratchet means to reposition said ratchet gear and said pilot valve means.

16. An automatic water treating apparatus comprising, in combination, a water treating tank a reagent tank and reagent injection means, piping connected to both ends of said treating tank, a water supply pipe, a service pipe, and a waste pipe connected to said piping, a source of fluid supply for said reagent tank, a reagent pipe from said reagent tank having a connection to said treating tank, pressure operated valves located in said pipes and piping, rotary pilot valve means rotatable to preselected positions and arranged to control and position said valves from a service position, through regeneration positions and back to said service position, one of said valves being a reagent injector valve and another of said valves being a reagent refill valve, said pilot valve means serving in one position to open said reagent injector valve to draw reagent from said reagent tank, and said pilot valve means serving in another position to open said reagent refill valve to refill said reagent tank, said pilot valve means having a shaft carrying a ratchet gear and ratchet means thereon for rotating said pilot valve means progressively from one position to another, an electrically controlled device for moving said ratchet means and said ratchet gear forward and return to a starting position, a water meter located in said water supply pipe, a cam carrier arranged to be rotated as water flows through said meter, said cam carrier having attached thereon individually adjustable cams, said cams being spaced on said carrier in spaced relation to preselected flows of water through said meter, an electric circuit having a source of electric current, a plurality of electrical switches, said switches and said electrically controlled device arranged in said circuit, and a level operated means in said reagent tank, two of said switches arranged to be actuated by said level operated means and others of said switches arranged in the paths of said cams to be actuated thereby to cause a flow of electric current to operate said electrically controlled device for moving said ratchet means to reposition said ratchet gear and said pilot valve means.

17. An automatic water treating apparatus comprising, in combination, a water treating tank a reagent tank and reagent injection means, piping connected to both ends of said treating tank, a water supply pipe, a service pipe, and a waste pipe connected to said piping, a source of fluid supply for said reagent tank, a reagent pipe from said reagent tank having a connection to said treating tank, pressure operated valves located in said pipes and piping, rotary pilot valve means rotatable to preselected positions and arranged to control and position said valves from a service position, through regeneration positions and back to said service position, one of said valves being a reagent injector valve and another of said valves being a reagent refill valve, said pilot valve means serving in one position to open said reagent injector valve to draw reagent from said reagent tank, and said pilot valve means serving in another position to open said reagent refill valve to refill said reagent tank, said pilot valve means having a shaft carrying a ratchet gear and ratchet means thereon for rotating said pilot valve means progressively from one position to another, an electrically controlled device for moving said ratchet means and said ratchet gear forward and return to a starting position, a spring locating means for locating said ratchet gear and said pilot valve means in each position and preventing return movement thereof upon return of said ratchet means, a water meter located in said water supply pipe, a cam carrier arranged to be rotated as water flows through said meter, said cam carrier having attached thereon individually adjustable cams, said cams being spaced on said carrier in spaced relation to the flow of water through said meter, an electric circuit having a source of electric current, a plurality of electrical switches, said switches and said electrically controlled device arranged in said circuit, and a level operated means in said reagent tank for actuating at least one of said switches.

18. An automatic water treating apparatus as set forth in claim 15, in which said electrically controlled device includes an electric motor and program switches having a shaft rotatable through 180° to move said ratchet means forward and through a second 180° to return said ratchet means to a starting position.

19. An automatic water treating apparatus as set forth in claim 15, in which said electrically controlled device includes a solenoid for moving said ratchet means forward and a spring for returning said ratchet means to a starting position.

20. An automatic water treating apparatus as set forth in claim 15, in which said electrically controlled device includes a solenoid valve, a chamber, an open outlet therefrom, a diaphragm in said chamber adapted to be moved in one direction by water pressure when said solenoid valve is opened for moving said ratchet means forward, and a spring for returning said ratchet means to a starting position when said solenoid valve is closed.

21. An automatic water treating apparatus comprising, in combination, a water treating tank a reagent tank and reagent injection means, piping connected to both ends of said treating tank, a water supply pipe, a service pipe, and a waste pipe connected to said piping, a reagent pipe from said reagent tank having a connection to said treating tank, power operated valves located in said pipes and piping, control means including an electrically controlled device arranged to position said valves from a service position, through regeneration positions and back to said service position, one of said valves being a reagent injector valve and another of said valves being a reagent refill valve, said control means serving in one position to open said reagent injector valve to draw reagent from said reagent tank, and said control means serving in another position to open said reagent refill valve to refill said reagent tank, a meter located in said water supply pipe, a disk rotated by said meter as water flows therethrough, individually adjustable cams spaced on said disk in relation to the flow of water through said meter, an electric circuit having a source of electric current, a plurality of switches, said switches and said electrically controlled device arranged in said circuit, some of said switches positioned to be closed by said cams to actuate said control means, level operated means in said reagent tank for closing one of said switches at a low level of the reagent in the reagent tank and another at a high level of the reagent therein, and the closing of said switch by the high level in said reagent tank serving to actuate said control means for positioning said valves from the last of said regeneration positions to said service position.

22. An automatic water treating apparatus comprising, in combination, a water treating tank, a reagent tank and reagent injection means, piping connected to both ends of said treating tank, a water supply pipe, a service pipe, and a waste pipe connected to said piping, a reagent pipe from said reagent tank having a connection to said treating tank, power operated valves located in said pipes and piping, control means including an electrically controlled device arranged to position said valves from a service position, through regeneration positions and back to service position, one of said valves being a reagent injector valve and another of said valves being a reagent refill valve, said control means serving in one position to open said reagent injector valve to draw reagent from said reagent tank, and said control means serving in another position to open said reagent refill valve to refill said reagent tank, a meter located in said water supply pipe, a disk rotated by said meter as water flows therethrough, individually adjustable cams spaced on said disk in relation to the flow of water through said meter, an electric circuit having a source of electric current, a plurality of switches, said switches and said electrically controlled device arranged in said circuit, some of said switches positioned to be closed by said cams to actuate said control means, level operated means in said reagent tank for closing one of said switches at a low level of the reagent and another at a high level of the reagent therein, the closing of said switch by the high level in said reagent tank serving to actuate said control means for positioning said valves from the last of said regeneration positions to said service position, and a cam moved by said control means for rotating forward said disk to position said cams thereon in a starting position.

23. An automatic water treating apparatus as set forth in claim 21, including a housing attached to said meter enclosing said control means, said disk, and the switches which are operated by said cams on said disk.

24. The combination in an automatic water treating apparatus having a water treating tank, a water supply pipe, a service pipe, and a waste pipe connected to both ends of said treating tank, a plurality of pressure operated valves located in said pipes, control means for said valves comprising pilot valve means rotatable to successive positions and arranged to open and close said valves, an actuator having means for rotating said pilot valve means to different positions, of a water meter located in said water supply pipe, a disk carrying individual adjustable cams, transmission means connecting said meter with said disk and including two sets of change gears to change the rate of rotation of said disk with respect to the rate of movement of said meter, an electric circuit, a plurality of electrical switches arranged in said circuit and positioned to be closed by said cams, and means for actuating said actuator controlled by said switches for rotating said pilot valve means.

LEE G. DANIELS.